United States Patent
Ji et al.

(10) Patent No.: US 9,832,811 B2
(45) Date of Patent: *Nov. 28, 2017

(54) ADAPTIVE PHYSICAL LAYER WARM-UP FOR LTE TDD C-DRX POWER OPTIMIZATION

(71) Applicant: Apple Inc., Cupertino, CA (US)

(72) Inventors: Zhu Ji, San Jose, CA (US); Johnson O. Sebeni, Fremont, CA (US); Tahir Shamim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 15/083,142

(22) Filed: Mar. 28, 2016

(65) Prior Publication Data
US 2016/0323930 A1   Nov. 3, 2016

Related U.S. Application Data

(63) Continuation of application No. 14/279,160, filed on May 15, 2014, now Pat. No. 9,301,257.

(51) Int. Cl.
*H04W 76/04* (2009.01)
*H04W 52/02* (2009.01)
(Continued)

(52) U.S. Cl.
CPC ........ *H04W 76/048* (2013.01); *H04B 17/336* (2015.01); *H04W 52/02* (2013.01);
(Continued)

(58) Field of Classification Search
None
See application file for complete search history.

(56) References Cited

U.S. PATENT DOCUMENTS 8,121,045 B2   2/2012 Cai et al.
8,311,593 B2  11/2012 Harris et al.
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.0.0, Dec. 2013, 57 pages.

(Continued)

*Primary Examiner* — Hassan Kizou
*Assistant Examiner* — Hashim Bhatti
(74) *Attorney, Agent, or Firm* — Downey Brand LLP

(57) ABSTRACT

Methods and apparatus to reduce power consumption in user equipment (UE) that operates in a connected discontinuous reception (C-DRX) mode while in communication with wireless network are disclosed. A C-DRX warm-up period before the UE enters an on-duration is adjusted dynamically based on one or more factors including a time division duplex (TDD) uplink/downlink (UL/DL) subframe configuration, signal-to-noise ratio (SNR) values, and Doppler shift values. The C-DRX warm-up period is adapted based on the pattern of DL subframes in the UL/DL subframe configuration by including DL subframes that best contribute to channel estimation and adaptive tracking loops based on measured SNR and Doppler shift conditions. Favorable channel conditions, such as higher SNR and lower Doppler shift, can require fewer DL subframes and consequently shorter C-DRX warm-up periods. Higher Doppler shift values indicate more rapidly varying channel conditions and require DL subframes positioned closer to the start of the on-duration.

20 Claims, 13 Drawing Sheets

(51) Int. Cl.
　　*H04B 17/336*　　(2015.01)
　　*H04L 5/00*　　(2006.01)
　　*H04W 84/04*　　(2009.01)

(52) U.S. Cl.
　　CPC ... *H04W 52/0216* (2013.01); *H04W 52/0245* (2013.01); *H04L 5/0005* (2013.01); *H04L 5/0007* (2013.01); *H04W 84/042* (2013.01); *Y02B 60/50* (2013.01)

(56) References Cited

U.S. PATENT DOCUMENTS

| | | | |
|---|---|---|---|
| 8,315,194 | B2 | 11/2012 | Jeong et al. |
| 9,066,261 | B2 | 6/2015 | Ji et al. |
| 9,301,257 | B2 | 3/2016 | Ji et al. |
| 2007/0178875 | A1* | 8/2007 | Rao ............ H04W 52/028 455/343.1 |
| 2010/0298001 | A1 | 11/2010 | Dimou et al. |
| 2011/0188428 | A1 | 8/2011 | Ishii |
| 2014/0022909 | A1* | 1/2014 | Mahmoud ....... H04W 76/048 370/241 |
| 2014/0301263 | A1* | 10/2014 | Ji ............... H04W 52/0216 370/311 |
| 2015/0181641 | A1* | 6/2015 | Farajidana ....... H04W 52/0216 370/311 |
| 2015/0334656 | A1 | 11/2015 | Ji et al. |
| 2016/0014695 | A1* | 1/2016 | Ehsan ............ H04L 5/14 370/311 |

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 V12.0.0, Dec. 2013, 120 pages.

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.0.0, Dec. 2013, 349 pages.

"3rd Generation Partnership Project; Technical Specification Group Radio Access Network; Evolved Universal Terrestrial Radio Access (E-UTRA); Medium Access Control (MAC) protocol specification (Release 9)," 3GPP TS 36.321 V9.6.0, Mar. 2012, 48 pages.

* cited by examiner

| UL/DL Configuration | DL-to-UL Switch Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

D = Downlink Subframe
S = Special Subframe
U = Uplink Subframe

| UL/DL config | Subframe Number | | | | | | | | | | Sequence | | | | Sequence Occurrence | | |
|---|---|---|---|---|---|---|---|---|---|---|---|---|---|---|---|---|---|
| | 0 | 1 | 2 | 3 | 4 | 5 | 6 | 7 | 8 | 9 | RDL | dSSF | uDL | 1st | 2nd | 3rd |
| 0 | D | S | U | U | U | D | S | U | U | U | 0 | 3 | 2 | dSSF | uDL | dSSF |
| 1 | D | S | U | U | D | D | S | U | U | D | 2 | 3 | 3 | uDL | dSSF | RDL |
| 2 | D | S | U | D | D | D | S | U | D | D | 5 | 1 | 3 | RDL | uDL | dSSF |
| 3 | D | S | U | U | U | D | D | D | D | D | 9 | 1 | 1 | RDL | RDL | RDL |
| 4 | D | S | U | U | D | D | D | D | D | D | 10 | 1 | 1 | RDL | RDL | RDL |
| 5 | D | S | U | D | D | D | D | D | D | D | 11 | 1 | 1 | RDL | RDL | RDL |
| 6 | D | S | U | U | U | D | S | U | U | D | 1 | 3 | 3 | uDL | dSSF | uDL |

| | |
|---|---|
| D | downlink |
| S | special subframe |
| U | uplink |

| Seq | Requirements | SNR | Dopl |
|---|---|---|---|
| RDL | 2 or more consecutive DL subframes | M,H | L,M |
| dSSF | a SSF that immediately follows at least 1 DL subframe | M,H | L,M |
| uDL | a DL subframes that immediately follows a UL subframe | H | H |

SNR = signal-to-noise
Dopl = Doppler effect
L, M, H = low, medium, high
Seq = sequence

*FIG. 3B*

Subframe Offset Values

| TDD UL/DL configuration | Position of initial Semi-Persistent grant | Subframe_Offset value (ms) |
|---|---|---|
| 0 | N/A | 0 |
| 1 | Subframes 2 and 7 | 1 |
| 1 | Subframes 3 and 8 | -1 |
| 2 | Subframe 2 | 5 |
| 2 | Subframe 7 | -5 |
| 3 | Subframes 2 and 3 | 1 |
| 3 | Subframe 4 | -2 |
| 4 | Subframe 2 | 1 |
| 4 | Subframe 3 | -1 |
| 5 | N/A | 0 |
| 6 | N/A | 0 |

*FIG. 4B*

ADAPTIVE PHYSICAL LAYER WARM-UP FOR LTE TDD C-DRX POWER OPTIMIZATION

CROSS REFERENCE TO RELATED APPLICATIONS

This application is a continuation of U.S. patent application Ser. No. 14/279,160, filed May 15, 2014, which is incorporated by reference herein in its entirety.

FIELD

The described embodiments generally relate to reducing power consumption in wireless user equipment (UE) while in communication with a wireless network, and more particularly, to methods and systems for power optimization by a UE operating in a connected discontinuous reception (C-DRX) mode in a Long Term Evolution Time Division Duplex (LTE TDD TDD) wireless system.

BACKGROUND

Packet data traffic can occur as a random sequence of transmit and receive time periods of active data transfer interspersed with periods of silence. To minimize delay when transmitting and/or receiving packet data traffic, the UE can monitor downlink control signals in each subframe in order to receive uplink grants or downlink data transmissions and to react to changes in the packet data traffic's behavior. However, such monitoring and responsiveness can come at a cost in terms of power consumption by the UE. To reduce power consumption by the UE, LTE wireless communication protocols specify discontinuous reception (DRX) modes of operation. Using a DRX mode, the UE can "sleep" for periods of time, neither transmitting nor receiving while "sleeping," and thereby preserve battery life. DRX modes can apply to operation of the UE in two different states, namely in an "Idle" state and in a "Connected" state. In the Idle state, operating in a DRX mode can increase battery life of the UE, as the UE can power down for periods of time, during which the UE may not use radio resources. While in the Idle state, the UE is not actively connected to the wireless network, although the wireless network is able to interact with the UE through paging mechanisms. Using a DRX mode while in the Connected state, the UE can be operating in a C-DRX mode.

LTE wireless systems can operate using a time division duplex (TDD) mode, which can be referred to as Long Term Evolution Time Division Duplex or LTE TDD. Within an LTE TDD wireless system, uplink (UL) and downlink (DL) data can be multiplexed according to a time division duplex (TDD) frame format. The structure of the LTE TDD frame format can include a sequence of uplink (UL) subframes, downlink (DL) subframes, and special subframes (SSF). LTE TDD specifications include a number of different uplink/downlink (UL/DL) subframe configurations that provide for different numbers of UL subframes, DL subframes, and special subframes in each LTE TDD frame. To ensure reliable service, existing LTE TDD solutions define a C-DRX warm-up period that is identical, having a fixed length, for all the different UL/DL subframe configurations. However, as the structure of the UL/DL subframe configuration can vary, and as channel conditions for the wireless communication channel between the UE and the wireless network can also vary, there is an opportunity to adapt the length of the C-DRX warm-up period rather than use a fixed length C-DRX warm-up period. Thus, it can be desirable to develop apparatus and methods that adapt the C-DRX warm-up period in order to reduce power consumption and improve performance of the UE when operating in a C-DRX mode connected to an LTE TDD wireless network.

SUMMARY

Power consumption is a significant challenge for user equipment (UE) operating in high performance wireless networks, e.g., as part of an LTE or LTE-Advanced wireless system. To reduce power consumption, a UE can operate using a discontinuous reception (DRX) mode. For LTE wireless communication protocols, a DRX mode includes operation of the UE while in a radio resource control connected (RRC_CONNECTED) state, which is referred to as a "connected" discontinuous reception (C-DRX) mode. In the RRC_CONNECTED state, the C-DRX mode can be enabled during time periods when the UE has no pending data packets to be transmitted and/or received. An enhanced Node B (eNodeB) of an LTE wireless network, to which the UE can be connected, can initiate use of the C-DRX mode to reduce power consumption during periods of data inactivity while operating in the RRC_CONNECTED state. Similarly, the UE can initiate use of the C-DRX mode.

Each C-DRX cycle during operation of a C-DRX mode includes an "on" time period and an "off" time period. The "on" time period can also be referred to as an "on-duration" or an "on-duration period" herein. During the "on" time period, the UE monitors communication from the LTE TDD wireless network. During the "off" time period, the UE does not monitor downlink channels from the LTE TDD wireless network to conserve power. A C-DRX warm-up period immediately precedes the start of an "on" time period. During the C-DRX warm-up period, the UE can adapt tracking loops and perform channel estimation for the downlink channel before receiving signals from the LTE TDD wireless network during the subsequent "on" time period. The UE can measure the downlink channel using DL subframes and, in some embodiments, portions of select special subframes as part of a C-DRX warm-up process. For channel estimation and tracking loop adaptation during the C-DRX warm-up period, a set of consecutive DL subframes can be highly desirable. In some cases, special subframes (or SSF) can be used to contribute to early completion of the C-DRX warm-up process.

In LTE TDD operation, in accordance with existing LTE TDD solutions, the length of the C-DRX warm-up period includes a minimum (fixed) number of downlink subframes, which can translate into a particular total number of subframes in the C-DRX warm-up period based on the particular UL/DL subframe configuration being used. Existing solutions select a "conservative" fixed number of downlink subframes for the C-DRX warm-up period in order to accommodate all possible LTE TDD UL/DL subframe configurations. An LTE TDD UL/DL subframe configuration includes a sequence of one or more uplink subframes, one of more downlink subframes, and one or more special subframes. The LTE TDD specification defines seven distinct UL/DL subframe configurations. Although existing LTE TDD solutions specify a fixed number of DL subframes to include in the C-DRX warm-up period, by accounting for the particular UL/DL subframe configuration in use and by measuring characteristics of the downlink channel, the UE can select how many subframes (and in particular which DL subframes) to use during the C-DRX warm-up period. Using fewer subframes, the UE can adapt the length of each C-DRX warm-up period that occurs before the start of a subsequent "on" duration period. By adapting the length of the C-DRX warm-up period, the UE can reduce its power consumption by remaining in a power reduced "sleep" state for a longer period of time.

Considering the aforementioned factors, methods to determine and adapt the number of subframes in a C-DRX warm-up period can include configuring a UE to respond to the following: (1) a structure of the UL/DL subframe configuration in use, including the number and relative position of DL, UL and special subframes in the UL/DL subframe configuration; (2) measurement of a signal-to-noise ratio (SNR) (or signal-to-noise-plus-interference ratio, SINR) of the LTE TDD downlink channel; and (3) measurement of a Doppler shift of the LTE TDD downlink channel. By analyzing these elements, the UE can select which subframes to use in order to determine a total length for the C-DRX warm-up period.

Three different C-DRX power optimization techniques for adjusting the C-DRX warm-up period in a UE of an LTE TDD system are described herein: (1) a Reduced DL Subframe (RDL) technique, (2) a Special Subframe with DL Subframe (dSSF) technique, and (3) a Minimal Channel Estimation (uDL) technique. For the RDL technique, with favorable channel conditions, such as for low to medium values of Doppler shift and medium to high SNR values, the length of a C-DRX warm-up period can be adapted to use fewer (and in so embodiments, only) DL subframes for tracking loops and for channel estimation during the C-DRX warm-up period. The channel can vary slowly over time (e.g., as indicated by lower Doppler shift values), and an accurate channel estimate can be achieved using fewer DL subframes (as indicated by higher SNR values). When the particular UL/DL subframe configuration for the channel includes two or more consecutive DL subframes, and with favorable channel conditions, the number of subframes used for the C-DRX warm-up period can be adapted accordingly. For the dSSF technique, with similarly favorable channel conditions, e.g., low to medium values of Doppler shift and medium to high SNR values, special subframes can be included with DL subframes for channel estimation during the C-DRX warm-up period. The number of subframes used for tracking loops and/or channel estimation in the C-DRX warm-up period can be adjusted when a special subframe immediately follows at least one DL subframe. For the Minimal Channel Estimation technique, with high values of Doppler shift and high SNR values, a C-DRX warm-up period can be adapted to use a minimal number subframes, e.g., down to a single subframe in some cases. As the LTE TDD downlink channel can vary rapidly (e.g., as indicated by higher Doppler shift values), channel estimation that uses only subframes that immediately precede the "on" time period of the C-DRX cycle can be preferred. One or more downlink subframes that immediately follow one or more uplink subframes is referred to herein as an "uDL" sequence, i.e., a special case of a DL sequence within an UL/DL subframe configuration. Considering that no DL subframes occur immediately before an "uDL" sequence, channel estimation using only the DL subframes in the uDL sequence can result in an effective and fast warm-up for channel estimation states based on received reference signals. Therefore, under rapidly varying channel conditions, e.g., as indicated by higher Doppler shift, a uDL sequence that immediately precedes the start of a C-DRX "on" time period can be used for tracking loops and/or for channel estimation. Other DL subframes that are further separated in time from the start of the C-DRX "on" time period can be less preferred when the channel rapidly varies over time. Under favorable channel conditions, e.g., as indicated by higher SNR, one of more DL subframes of a single uDL sequence can suffice for channel estimation and tracking loops under the accompanying high Doppler shift conditions. In this special case, the C-DRX warm-up time period can be adapted to use as few as only a single downlink subframe that immediately precedes the "on" time period of the C-DRX cycle.

The aforementioned techniques describe monitoring communication channel properties, e.g., Doppler shift and/or SNR, and based on the monitored communication channel properties and on a particular UL/DL configuration in use, adapting which subframes to include in a C-DRX warm-up period to adapt the length of the C-DRX warm-up period and thereby reduce power consumption by the UE.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

FIG. 3A illustrates a set of LTE TDD UL/DL subframe configurations and their associated sequences of uplink subframes, downlink subframes and special subframes for an LTE TDD wireless communication network, in accordance with some embodiments.

FIG. 3B illustrates LTE TDD UL/DL subframe configurations and their associated sequences of uplink subframes, downlink subframes and special subframes for a C-DRX warm-up period that spans fifteen subframes, which can be used when a fixed number of downlink subframes is used for all UL/DL subframe configurations, in accordance with some embodiments.

FIG. 4B illustrates a set of subframe offset values for different LTE TDD UL/DL subframe configurations, in accordance with some embodiments.

DETAILED DESCRIPTION

Figure 1:
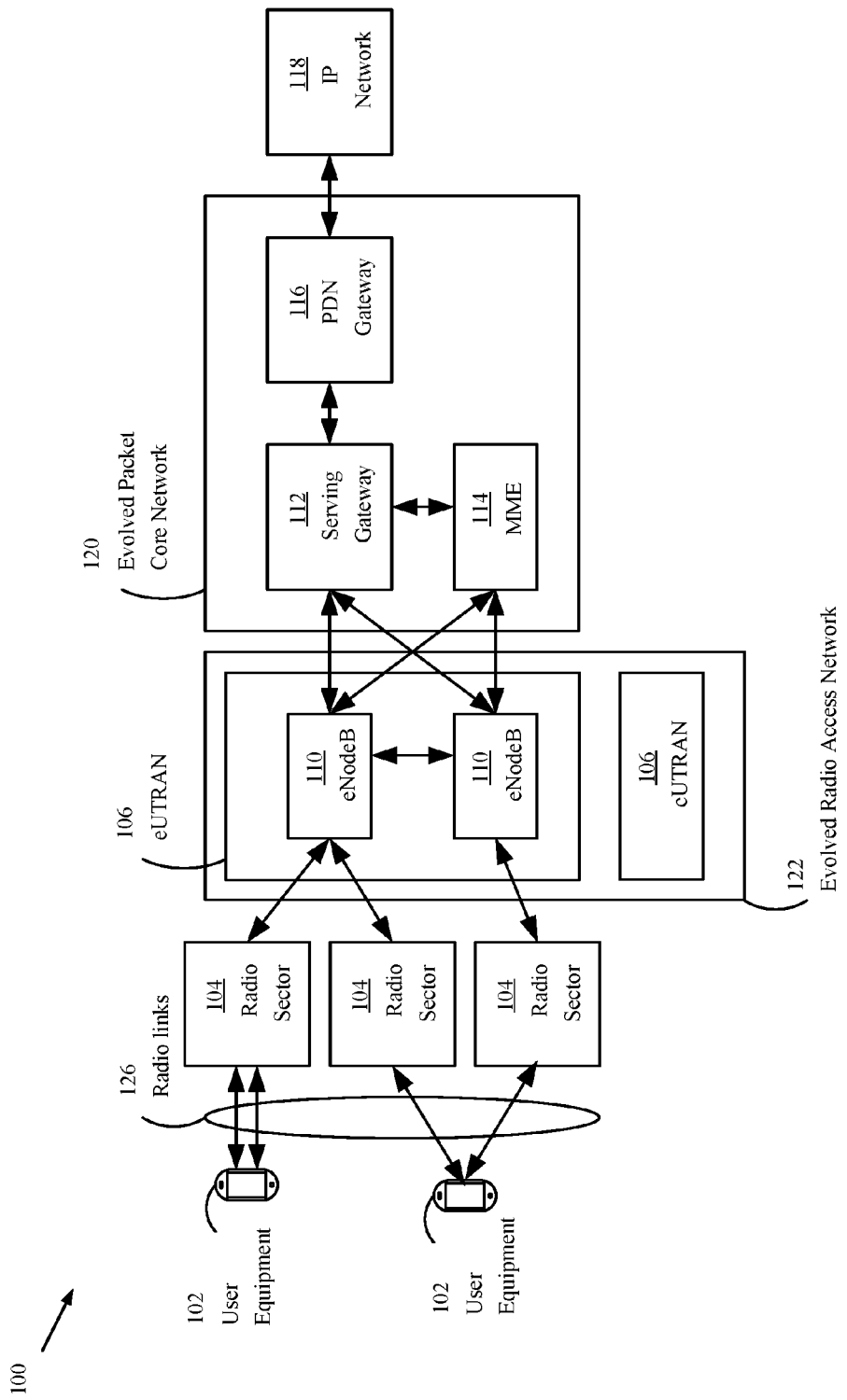
FIG. 1 illustrates a Long Term Evolution (LTE) wireless communication network in accordance with some embodiments.

Reference will now be made in detail to representative embodiments illustrated in the accompanying drawings. Although the embodiments of this disclosure are described in sufficient detail to enable one having ordinary skill in the art to practice the described implementations, it should be understood that these examples are not to be construed as being overly-limiting or all-inclusive. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Representative example methods to save power in wireless devices operating in LTE TDD networks using one or more discontinuous reception modes are provided herein. The examples are provided to add context to, and to aid in the understanding of, the subject matter of this disclosure. It should be apparent that the present disclosure may be practiced with or without some of the specific details described herein. Further, various modifications and/or alterations can be made to the subject matter described herein, and illustrated in the corresponding figures, to achieve similar advantages and results, without departing from the spirit and scope of the disclosure.

In accordance with various embodiments described herein, the terms "wireless communication device," "wireless device," "mobile device," "mobile station," and "user equipment" (UE) may be used interchangeably herein to describe one, or any number of, common consumer electronic device(s) that may be capable of performing procedures associated various embodiments of the disclosure. In accordance with various implementations, any one of these consumer electronic devices may relate to: a cellular phone or a smart phone, a tablet computer, a laptop computer or a netbook computer, a media player device, an electronic book device, a MiFi® device, as well as any other type of electronic computing device having fourth generation (4G) LTE and LTE Advanced (LTE-A) communication capabilities. In various embodiments, these capabilities may allow a respective UE to communicate within various 4G network cells that can employ any type of LTE-based radio access technology (RAT). A UE can communicate with network equipment such as a base transceiver station (BTS).

Long Term Evolution (LTE) wireless communication networks can be referred to as fourth generation (4G) wireless networks and can provide advanced communication capabilities for UEs that operate in accordance with LTE wireless communication protocols specified by the 3rd Generation Partnership Project (3GPP). Long Term Evolution Time Division Duplex (LTE TDD) is one variant of a 4G wireless telecommunications technology and standard.

The following disclosure relates to methods and apparatus for power optimization by a mobile wireless device operating in a discontinuous reception (DRX) mode using an LTE wireless communication protocol. In some embodiments, the DRX mode is a "Connected" DRX (C-DRX) mode of operation, and the LTE wireless communication protocol is an LTE TDD wireless communication protocol. New generation mobile communication systems, such as those that use LTE TDD or other LTE variants, aim to provide to customers a new mobile experience, e.g., by offering higher data rates and lower latencies that can enable mobile wireless devices to run new services and applications. However, the energy requirements for these new services and applications can prove demanding of limited battery power resources available in a mobile wireless device. The development of new architectures and procedures for power-efficient and power-aware systems is a high priority in the design of new generation wireless networks and mobile wireless devices.

Power consumption is a significant challenge for user equipment (UE) operating in high performance wireless networks, e.g., as part of an LTE or LTE-Advanced wireless system. To reduce power consumption, a UE can operate using a discontinuous reception (DRX) mode, e.g., while in an "idle" state or while in a "connected" state. For LTE wireless communication protocols, operation of the UE while in a radio resource control connected (RRC_CONNECTED) state is referred to as a "connected" discontinuous reception (C-DRX) mode. In the RRC_CONNECTED state, the C-DRX mode can be enabled during time periods when the UE has no pending data packets to transmit and/or to receive. An enhanced Node B (eNodeB) of an LTE wireless network, to which the UE can be connected, can initiate use of the C-DRX mode to reduce power consumption during periods of data inactivity while the UE operates in the RRC_CONNECTED state. Similarly, the UE can initiate use of the C-DRX mode.

Each C-DRX cycle during operation in a C-DRX mode includes an "on" time period and an "off" time period. During the "on" time period, the UE monitors communication from the LTE TDD wireless network. During the "off" time period, the UE does not monitor downlink channels from the LTE TDD wireless network to conserve power. A C-DRX warm-up period immediately precedes the start of an "on" time period of a C-DRX cycle. During the C-DRX warm-up period, the UE can adapt tracking loops and perform channel estimation for the downlink channel before receiving signals from the LTE TDD wireless network during the subsequent "on" time period. The UE can measure the downlink channel using DL subframes and, in some embodiments, can use portions of select special subframes as part of a C-DRX warm-up process. For channel estimation and tracking loop adaptation during the C-DRX warm-up period, a set of consecutive DL subframes can be highly desirable. In some cases, special subframes can be used to contribute to early completion of the C-DRX warm-up process. The C-DRX warm-up period can be referred to as an "off to on" transition period.

When operating in accordance with an LTE TDD wireless communication protocol, existing solutions use a "conservative" fixed value for the length of the C-DRX warm-up period, in order to accommodate all possible TDD frame formats UL/DL subframe configurations. An LTE TDD frame format UL/DL subframe configuration includes a sequence of one or more uplink subframes, one of more downlink subframes, and one or more special subframes. LTE TDD specifications define seven distinct UL/DL subframe configurations. Although the existing LTE TDD solutions specify a fixed value for the length of the C-DRX warm-up period, by accounting for a particular UL/DL subframe configuration in use and by measuring characteristics of a downlink communication channel between the UE and the LTE TDD wireless network, the UE can select which subframes to use during the C-DRX warm-up period. By using fewer subframes, the UE can adapt the length of the C-DRX warm-up period before the start of the "on" duration period. By reducing the length of the C-DRX warm-up period, the power consumption of the UE is reduced.

Some of the challenges for implementing an adaptive C-DRX warm-up period include: 1) noncontiguous DL subframes that can interrupt algorithms for tracking loops and channel estimates, 2) longer C-DRX warm-up periods due to UL/DL configuration scaling, and 3) deterioration of channel estimates based on special subframes in high Doppler scenarios. However, from a positive perspective, some motivations for using an adaptive approach include (1) only DL subframes need be considered for C-DRX warm-up periods based on LTE specifications; (2) reasonable channel estimation performance can be achieved using special subframes (to supplement DL subframes) in medium to low Doppler shift scenarios; (3) a UE can adapt the start position of the C-DRX "on" time period based on a specific UL/DL subframe configuration; and (4) one or more DL subframes that immediately follow one or more UL subframes and immediately precede the C-DRX "on" time period can provide for quicker channel estimation in a high Doppler shift, high SNR environment.

Considering the aforementioned factors, methods to adapt the number of subframes of a C-DRX warm-up period can include configuring a UE to respond to the following: (1) a structure of the UL/DL subframe configuration in use, including the number and relative position of DL, UL and special subframes in the UL/DL subframe configuration; (2) measurement of a signal-to-noise ratio (SNR) (or signal-to-noise plus interference ratio, SINR) of the LTE TDD downlink channel; and (3) measurement of a Doppler shift of the LTE TDD downlink channel. By analyzing these elements, the UE can select which subframes to use in order to determine the length of the C-DRX warm-up period. The UE can adapt the length of the C-DRX warm-up period over time as channel conditions and/or UL/DL configurations in use change.

Three different C-DRX power optimization techniques for determining a length of a C-DRX warm-up period in a UE of an LTE TDD system are described herein: (1) a Reduced DL Subframe (RDL) technique, (2) a Special Subframe with DL Subframe (dSSF) technique, and (3) a Minimal Channel Estimation (uDL) technique.

For the RDL technique, with favorable channel conditions, such as for low to medium Doppler shift values and medium to high SNR values, the length of the C-DRX warm-up period can be adapted to use fewer (and only) DL subframes for tracking loops and for channel estimation during the C-DRX warm-up period. The communication channel can vary slowly over time (as indicated by lower Doppler shift values), and an accurate channel estimate can be achieved using fewer DL subframes (as indicated by higher SNR values). When the particular UL/DL subframe configuration for the channel includes two or more consecutive DL subframes, and with favorable channel conditions, the number of subframes used for the C-DRX warm-up period can be adapted accordingly.

For the dSSF technique, with similarly favorable channel conditions, e.g., low to medium Doppler shift values and medium to high SNR values, special subframes can be included with DL subframes for channel estimation during the C-DRX warm-up period. The number of subframes used for tracking and/or channel estimation in the C-DRX warm-up period can be adapted when a special subframe immediately follows at least one DL subframe.

For the minimal Channel Estimation technique, with high Doppler shift values and high SNR values, a C-DRX warm-up period can be adapted to use to a minimal number subframes, e.g., a single subframe in some cases. As the LTE TDD downlink channel can vary rapidly (as indicated by higher Doppler shift values), channel estimation that uses only subframes that immediately precede the "on" time period of the C-DRX cycle can be preferred. A contiguous set of one or more DL subframes that immediately follow a UL subframe is referred to herein as a "uDL" sequence, i.e., a special case of a DL sequence. Under rapidly varying channel conditions, e.g., as indicated by higher Doppler shift values, a uDL sequence that immediately precedes the start of a C-DRX "on" time period can be used for tracking loops and/or for channel estimation. Other DL subframes that are further separated in time from the start of the C-DRX "on" time period can be less preferred when the channel rapidly varies over time. Under favorable channel conditions, e.g., as indicated by higher SNR, one or more DL subframes of the uDL sequence can suffice for channel estimation and tracking loops under the accompanying high Doppler shift conditions. In a special case, in which the uDL sequence includes only one DL subframe, the C-DRX warm-up time period is adapted to use the single DL subframe that immediately precedes the "on" time period of the C-DRX cycle.

The aforementioned techniques describe monitoring communication channel properties, e.g., Doppler shift and/or SNR, and based on (i) the monitored communication channel properties and on (ii) a particular UL/DL configuration in use, determining which subframes to include in a C-DRX warm-up period to adapt the length of the C-DRX warm-up period and thereby reduce power consumption by the UE. These methods and other embodiments are discussed below with reference to FIGS. 1-10. However, those skilled in the art will readily appreciate that the detailed description given herein with respect to these Figures is for explanatory purposes only and should not be construed as limiting.

FIG. 1 illustrates a representative Long Term Evolution (LTE) wireless network 100, e.g., as specified by 3GPP, that can include user equipment (UE) 102 connected by one or more radio links 126 to one or more radio sectors 104 provided by an evolved radio access network 122. Each radio sector 104 can represent a geographic area of radio coverage emanating from an associated evolved Node B (eNodeB) 110 using a radio frequency channel operating at a selected frequency. In some embodiments, radio sectors 104 can also be referred to as cells. Each eNodeB 110 can generate one or more radio sectors 104 to which the UE 102 can connect by one or more radio links 126. In some embodiments, an LTE wireless network 100, the UE 102 can be connected to more than one radio sector 104 simultaneously. The multiple radio sectors 104 to which the UE 102 can be connected can emanate from a single eNodeB 110 or from separate eNodeB's 110. A group of eNodeB's 110 can be referred to as an evolved Universal Mobile Telecommunications System (UMTS) radio access network (eUTRAN) 106. Typically each eNodeB 110 in an eUTRAN 106 can include a set of radio frequency transmitting and receiving equipment mounted on an antenna tower and a radio controller for controlling and processing transmitted and received radio frequency signals. The eNodeB 110 of the eUTRAN 106 can manage the establishment, maintenance and release of the radio links 126 that connect the UE 102 to an evolved radio access network 122. In some embodiments, the eNodeB 110 can provide access to a wireless network based on an LTE technology, such as an LTE wireless network and/or an LTE-Advanced (LTE-A) wireless network. It will be appreciated, however, that various example embodiments are not limited to application in LTE wireless network systems.

Radio resources that form the radio links 126 in the radio sectors 104 can be shared among multiple UEs 102 using a number of different multiplexing techniques, including time division, frequency division, code division, space division and combinations thereof. A radio resource control (RRC) signaling connection can be used to communicate between the UE 102 and the eNodeB 110 in the eUTRAN 106 of the evolved radio access network 122 including requests for and dynamic allocations of radio resources to multiple UEs 102. The UE 102 can be connected to the evolved radio access network 122 through one or more radio sectors 104 simultaneously.

The evolved radio access network 122, which provides radio frequency air link connections to the UE 102, connects also to an evolved packet core network 120. The LTE wireless network 100 can be designed to operate as a packet switched network exclusively. The evolved packet core network 120 can include serving gateways 112 that interconnect the evolved radio access network 122 to public data network (PDN) gateways 116 that connect to external internet protocol (IP) networks 118. The eNodeB's 110 can also be connected to a mobility management entity (MME) 114 that can provide control over connections for the user equipment 102. The eNodeB 110 can control allocation of radio resources for the radio links 126 to the user equipment 102. The eNodeB 110 can communicate paging messages to the user equipment 102, including paging messages to establish an RRC connection with the user equipment 102 and transition from an RRC_IDLE state to an RRC_CONNECTED state. The eNodeB 110 can schedule radio resources for the UE 102 and provide indications of radio resource allocations using signaling messages communicated in a physical downlink control channel (PDCCH). The UE 102 can monitor the PDCCH to determine when radio resources are assigned to the particular UE 102 for downlink transmission from the eNodeB 110 or for uplink transmission to the eNodeB 110. The eNodeB 110 can also broadcast System Information Block (SIB) messages periodically to inform the UE 102 about properties of the radio sectors 104 and/or for services provided by the eNodeB 110. Not shown, is the Mobility Management Entity (MME). The MME can be the key control-node for the LTE access-network. It can be responsible for idle state user equipment) tracking and paging procedure including retransmissions.

The Physical Downlink Shared Channel (PDSCH) can be the main data bearing channel which can be allocated to users on a dynamic and opportunistic basis. The PDSCH carries data organized as Transport Blocks (TB), which correspond to media access control (MAC) PDUs. The MAC PDUs are passed from the MAC layer to the PHY layer once per Transmission Time Interval (TTI), each TTI spanning one millisecond. The PDSCH can also be used to transmit broadcast information not transmitted on the Physical Broadcast Channel (PBCH), which includes System Information Blocks (SIBs) and paging messages.

The eNodeB 110 and the UE 102 can support operation in one or more DRX modes as further discussed herein. Terms relevant to a DRX mode are as follows.

- On-duration: Duration in downlink subframes that the UE 102 waits, after waking up from an "off" duration or sleep period of a DRX cycle, to receive PDCCHs. When the UE 102 successfully decodes a PDCCH, the UE 102 stays awake and starts an inactivity timer.
- DRX-InactivityTimer: Specifies the number of consecutive PDCCH-subframes(s) after the subframe in which the UE successfully decodes a PDCCH indicating an initial UL or DL user data transmission for UE 102. The UE 102 can restart the inactivity timer following a single successful decoding of a PDCCH for a first transmission only (DL or UL) (i.e. not for retransmissions).
- DRX Cycle: The periodic repetition of the on-duration period followed by a possible period of inactivity (DRX "off" time period). That is, the duration of one "ON" time period plus one "OFF" time period.
- shortDRX-Cycle: DRX cycle which can be implemented within the "OFF" time period of a long DRX Cycle. A few short DRX cycles may be used after the "on" time period of a long DRX cycle. After no activity during a set of short DRX cycles, a long "off" time period can be initiated.
- drxShortCycleTimer: The consecutive number of subframes that follow the short DRX cycle after the DRX Inactivity Timer has expired. The drxShortCycleTimer specifies the number of consecutive PDCCH-subframes that can follow the short cycle.
- Active-time: The time related to DRX operation during which the UE 102 monitors the Packet Dedicated Control Channel (PDCCH) in Packet Common Control Channel (PCCCH) subframes. The total time duration that the UE 102 is awake includes (1) the "On" duration of the DRX cycle, (2) the time UE 102 is performing continuous reception while the inactivity timer has not expired, and (3) the time UE 102 is performing continuous reception while waiting for a DL retransmission after one HARQ RTT. The minimum active-time equals at least a time of the on-duration. A HARQ RTT Timer is a parameter that can specify the minimum amount of subframe(s) before a DL HARQ retransmission is expected by the UE. (HARQ refers to a hybrid automatic repeat request and can be a combination of high-rate forward error-correcting coding and ARQ error-control; RTT is a round trip time.)
- drx-InactivityTimer: Specifies the number of consecutive PDCCH-subframe(s) after the subframe in which a PDCCH indicates an initial UL or DL user data transmission for this UE.

drx-RetransmissionTimer: Specifies the maximum number of consecutive PDCCH-subframe(s) until a DL retransmission is received, drxStartOffset: Specifies the subframe on which the DRX Cycle starts.

An LTE wireless network provides a DRX mode for use by a UE 102 while operating in an RRC_IDLE state, e.g., when listening for paging messages. The DRX mode can be used to save power by allowing the UE 102 to power down during pre-determined time intervals, thereby conserving limited battery power. A DRX cycle period determines how frequently a UE 102 "wakes" to check for paging messages. A default DRX cycle period can be broadcast within a System Information Block 2 (SIB2) message by the eNodeB of the LTE wireless network. LTE wireless communication protocols specify thirteen different types of SIB messages. Each SIB message carries information related to particular tasks. SIB2 messages carry radio resource configuration information that can be common for all UEs 102. SIB2 information can include random access channel (RACH) related parameters, idle state paging configurations, uplink physical control channel (PUCCH) configurations, physical uplink shared channel (PUSCH) configurations, uplink power control configurations, sounding reference signal configurations, uplink carrier frequency information, uplink bandwidth information, and cell barring information.

A SIB2 message can specify values of 32, 64, 128 or 256 radio frames for a length of a DRX cycle. A UE 102 can also propose its own DRX cycle length. The set of allowed values for a UE 102 specified DRX cycle can be the same as those used in the SIB2 message. When the UE 102 proposes its own DRX cycle, the smaller of the two DRX cycles can be used, i.e. the minimum of the default DRX cycle and the UE 102 specified DRX cycle.

Figure 2:
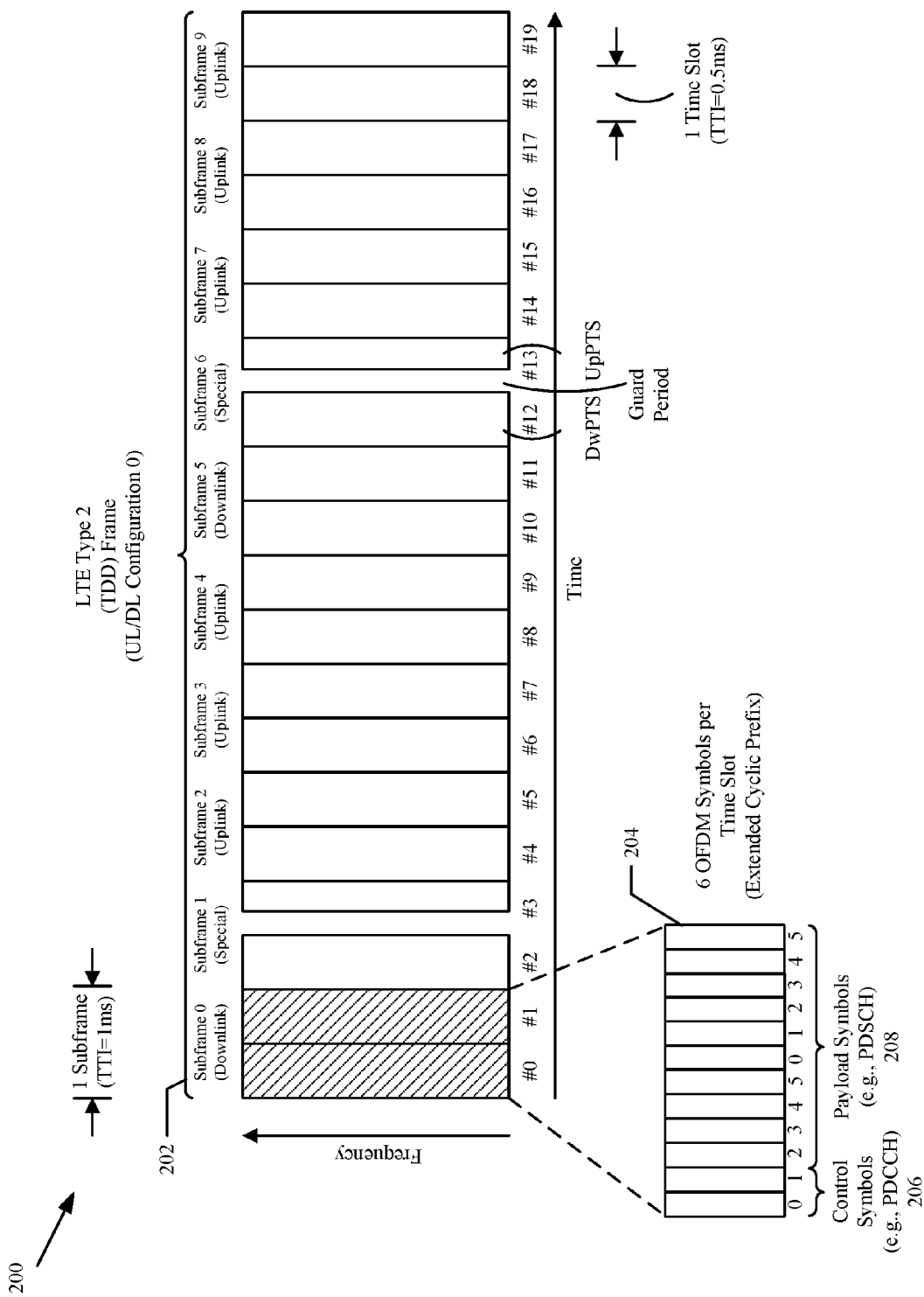
FIG. 2 illustrates a Type 2 frame structure for use in a Long Term Evolution Time Division Duplex (LTE TDD) wireless communication network in accordance with some embodiments.

FIG. 2 illustrates an LTE frame structure 200 for a time division duplex (TDD) frame 202, which can also be referred to as an LTE Type 2 frame, which is used for downlink and uplink transmission between the eNodeB 110 and the UE 102. Each LTE Type 2 TDD frame 202 spans a time period of ten milliseconds (10 ms) subdivided into ten consecutive subframes (numbered from 0 to 9) spanning 1 ms each. Each LTE Type 2 TDD Frame 202 includes one or more downlink (DL) subframes (for transmission from the eNodeB 110 to the UE 102), one or more uplink (UL) subframes (for transmission from the UE 102 to the eNodeB 110), and one or more special subframes. Special subframes include a downlink portion, a guard period, and an uplink portion. The guard period separates the UL portion from the DL portion and accounts for a round trip delay between the UE 102 and the eNodeB 110 and for multipath delay spread. The downlink portion of a special subframe can be referred to as a downlink pilot time slot (DwPTS), while the uplink portion of a special subframe can be referred to as an uplink pilot time slot (UpPTS). Special subframes can be used for TDD communication when transitioning from downlink to uplink transmission, but cannot be used when transitioning from uplink to downlink transmission.

FIG. 2 illustrates a diagram 200 of a particular LTE TDD UL/DL subframe configuration for an LTE Type 2 frame, namely UL/DL configuration 0, which includes two special subframes. LTE TDD UL/DL subframe configurations can include one or two special subframes within the LTE Type 2 frame. Downlink and uplink subframes in the LTE Type 2 TDD frame 202 are divided into two time slots, each time slot spanning 0.5 ms, while special subframes are divided into three time periods. A downlink subframe 204 includes multiple orthogonal frequency-division multiplexing (OFDM) symbols, which can include a combination of control symbols and payload symbols. The configuration of an LTE Type 2 TDD frame 202 can be specified in information broadcast in a system information block (SIB) message. The number of downlink subframes, special subframes, and uplink subframes can vary for different LTE TDD UL/DL subframe configurations.

FIG. 2 illustrates that each subframe includes two timeslots and each timeslot includes six OFDM symbols when an extended cyclic prefix is used. Therefore, a subframe includes twelve OFDM symbols in total. Among the twelve OFDM symbols, the first two OFDM symbols are control symbols (e.g., PDCCH 206) and the remaining ten OFDM symbols are payload symbols (e.g., PDSCH 208). FIG. 2 also illustrates the structure of a special subframe, as previously discussed. Referring to subframe 6, a special subframe includes three distinct regions: a DwPTS—Downlink Pilot Time Slot, a GP—Guard Period and an UpPTS—Uplink Pilot Time Slot. The regions of the special subframe are individually configurable in terms of length, although the total length of all three regions of the special subframe together must span 1 ms. The DwPTS is always reserved for downlink transmission, while the UpPTS and the subframe that immediately follows the special subframe are always reserved for uplink transmission.

FIG. 3A illustrates a table 300 of UL/DL subframe configurations for an LTE frame in an LTE TDD wireless network. Each UL/DL subframe configuration specifies a sequence of DL subframes, UL subframes, and special subframes. For example, UL/DL subframe configuration 0 is defined by subframe numbers 0 to 9 and has a subframe sequence of DSUUUDSUUU, where "D" indicates a DL subframe, "U" indicates an UL subframe and "S" indicates a special subframe. The LTE TDD frame 202 illustrated in FIG. 2 uses UL/DL subframe configuration 0. An UL/DL subframe configuration can also be referred to as an "UL/DL configuration" or an "UL/DL config" herein.

One advantage of LTE TDD is that it is possible to dynamically change the uplink and downlink balance to meet variable load conditions. For this objective to be achieved, a standardized set of UL/DL subframe configurations, as shown in FIG. 3A, is defined in LTE wireless communication protocols. A total of seven different uplink/downlink configurations (see UL/DL configurations 0 to 6 in FIG. 3A) have been established in LTE specifications, and these UL/DL configurations use either a 5 ms or a 10 ms switch periodicity. For 5 ms switch point periodicity, a special subframe exists in both half frames of a frame. For 10 ms switch point periodicity, the special subframe exists in the first half frame only of the frame. It can be observed from FIG. 3A that subframes 0 and 5 as well as DwPTS (see FIG. 2) are always reserved for downlink transmission. It can also be observed that UpPTS and the subframe that immediately follows the special subframe are always reserved for uplink transmission.

FIG. 3B illustrates each UL/DL subframe configuration for LTE TDD extended over a time period spanning one and one-half frames, i.e., spanning a total of fifteen subframes. Table 350 of FIG. 3B illustrates the associated sequences of uplink subframes, downlink subframes and special subframes for a fifteen subframe time period that can immediately precede a C-DRX "on" period, which can correspond to a C-DRX warm-up period. Table 350 of FIG. 3B shows a representative subframe sequence for a C-DRX warm-up period that includes a total of fifteen subframes, namely subframes 5 to 9 immediately followed by subframes 0 to 9.

As previously noted, DL subframes have special importance in the channel estimation process. Within an UL/DL subframe configuration, DL subframes are not always consecutive, which can prove challenging for channel estimation algorithms when "high Doppler" mobility of the UE 102 produces rapidly changing channel characteristics. Depending on an amount of Doppler shift, the communication channel may or may not be able to use non-consecutive DL subframes for channel estimation. With higher values of Doppler shift, which can indicate more rapid movement of the UE 102, characteristics of the communication channel can change from one DL subframe to a subsequent non-consecutive DL subframe. Thus, with higher values of Doppler shift, a set of contiguous DL subframes can be preferred for channel estimation.

As illustrated in Table 350, subframes 0 and 5 can be designated as DL subframes, which can include OFDM symbols with reference signals transmitted in specific resource elements. The reference signals can be used in estimating characteristics of the communication channel between the eNodeB 110 and the UE 102. Special subframes can also include a number of downlink OFDM symbols with reference signals embedded. As shown in FIG. 3B, DL subframes may not be consecutive within a frame, depending on the UL/DL subframe configuration. Long time gaps between DL subframes can prove challenging for the channel estimation process.

Table 350 includes three columns that describe parameter values for RDL sequences, dSSF sequences, and uDL sequences for each UL/DL subframe configuration. These sequences, defined herein, can be used for selecting a technique that can adapt the number of subframes of a C-DRX warm-up period.

1) Reduced DL Subframe (RDL) sequence—a sequence of subframes that includes two or more consecutive download subframes. This sequence of subframes can be referred to as an RDL sequence. When the frame includes an RDL sequence, the RDL technique can be selected, subject to channel conditions.
2) Special Subframe with DL Subframe (dSSF) sequence—a sequence of subframes that includes a special subframe immediately followed by a downlink subframe. This sequence of subframes can be referred to as a dSSF sequence. When the frame includes a dSSF sequence, the dSSF technique can be selected, subject to channel conditions.
3) Minimal Channel Estimation (uDL) sequence—a sequence of subframes that includes a downlink subframe that immediately follows an uplink subframe. This sequence of subframes can be referred to as a uDL sequence. When the frame includes a uDL sequence, the uDL technique can be selected, subject to channel conditions.
4) For the dSSF sequence, a first portion of the special subframe is reserved for downlink transmission (DwPTS) such that the dSSF sequence includes a DL subframe followed by the DwPTS portion of the special subframe and provides more information for channel estimation than a DL subframe alone.

The values presented in Table 350 for the RDL sequence, dSSF sequence and uDL sequence indicate the number of times that a specific sequence occurs in each UL/DL configuration. When a particular sequence occurs in a specific UL/DL configuration, an associated technique can be selected to determine the number of subframes used in a C-DRX warm-up period, subject to channel conditions. For example, for UL/DL configuration 0, the RDL sequence occurs zero times, and thus the reduced DL subframe (RDL) technique cannot be selected for UL/DL configuration 0. The minimal channel estimation (uDL) sequence occurs two times in UL/DL configuration 0, and the special subframe with a DL subframe (dSSF) sequence occurs three times in UL/DL configuration 0. Therefore, the uDL technique or the dSSF technique can be selected for UL/DL configuration 0, subject to channel conditions.

Table 350 also includes three columns under a heading labeled "Sequence Occurrence". These columns indicate the types of sequences that occur closest to the end of the C-DRX warm-up period, i.e., later in time (or most recently) in the subframe sequence. Later occurring sequences are more likely to indicate the most efficient sequence to adapt the length of the C-DRX warm-up period. For example, the latest occurring (or "first most recent") sequence for UL/DL configuration 0 is the dSSF sequence, located in subframes 5 and 6. The "second most recent" sequence is the uDL sequence, located in subframes 4 and 5. Depending on the channel conditions, the dSSF technique or the uDL technique can be selected to determine the length of the C-DRX warm-up period in order to reduce power consumption by the UE 102.

Figure 4A:
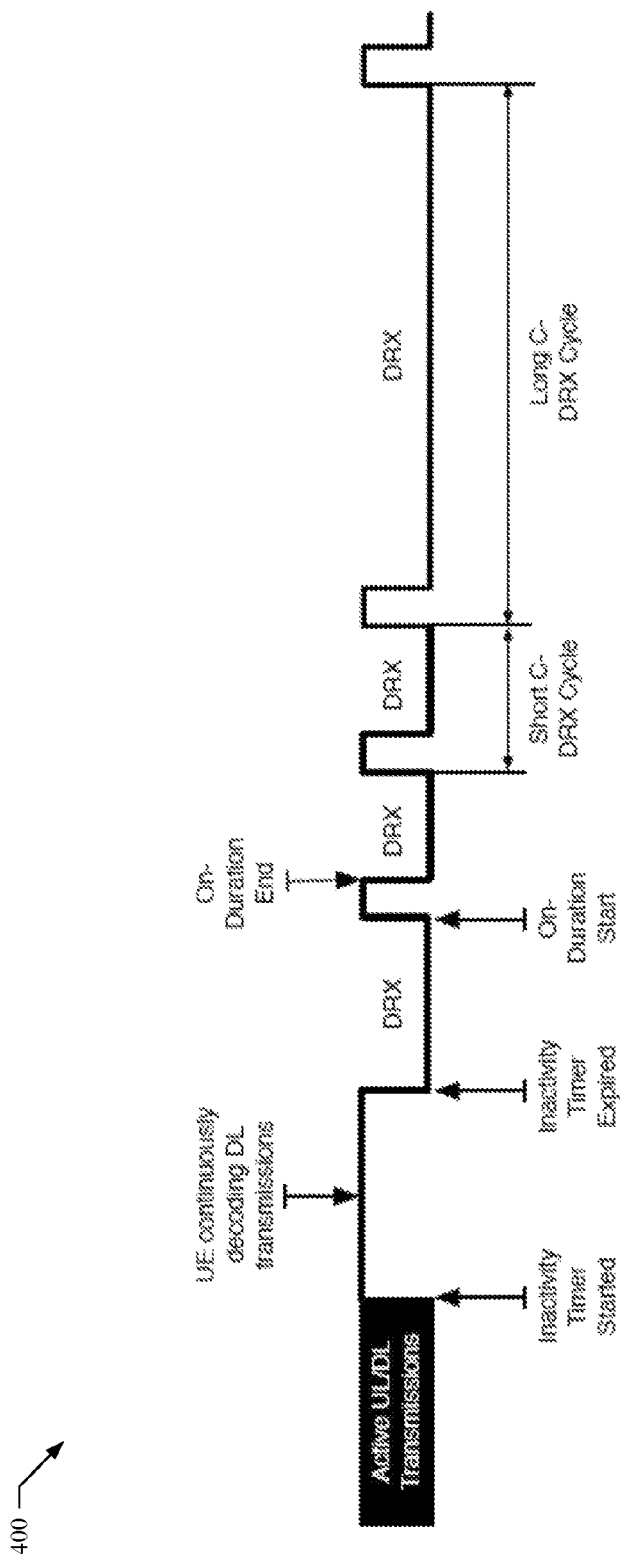
FIG. 4A illustrates implicit timing transitions for C-DRX operation in an LTE TDD wireless communication network, in accordance with some embodiments.

FIG. 4A illustrates timing transitions for C-DRX operation in an LTE TDD wireless communication system. The C-DRX mode includes an on-duration period and a DRX period ("off" time period). During the on-duration period, the UE 102 can monitor activity of the channel. During the DRX period, the UE 102 can skip reception of downlink channels in order to save power. Before the start of the on-duration period, the UE 102 can use a C-DRX warm-up period to adjust for changing channel conditions. The C-DRX warm-up period can be a time period between the time when the UE 102 receives a signal to "start-up" and the actual time when the UE 102 initiates the C-DRX on-duration period. More specifically, the C-DRX warm-up period can be specified as a time between a "cycle start offset" and the beginning of the on-duration. During the C-DRX warm-up period, the UE 102 can adjust various adaptive tracking loops and update channel estimations for the downlink channel to ensure quality reception of the channel during the on-duration period. The UE 102 can measure channel characteristics using the received DL subframes in order to perform the C-DRX warm-up process. In this regard, a sequence of consecutive DL subframes can be preferred over non-contiguous DL subframes that are separated in time by intervening UL subframes. In some cases, special subframes can have similar properties to DL subframes such that the special subframes can be used for channel estimation and adaptive tracking loops in performing the C-DRX warm-up process. Thus, a special subframe that immediately follows one or more DL subframes can provide information comparable to two or more consecutive DL subframes.

LTE networks can support the C-DRX mode to enable the UE 102 to save battery during periods of inactivity while connected to the LTE network but not actively transferring data with the LTE network. When the C-DRX mode is used while operating in a connected state, the UE 102 can monitor the PDCCH 206 during specific subframes. The UE 102 can begin a short C-DRX cycle or a long C-DRX cycle based on either of two methods:

Implicit—Based on the expiration of a C-DRX inactivity timer.

Explicit: The eNodeB 110 can instruct the UE 102 to enter the C-DRX mode immediately by sending a DRX Command MAC control element to the UE 102.

The UE 102 can start an inactivity timer after each period of activity. This inactivity timer defines a number of consecutive inactive subframes that the UE 102 can experience before entering the DRX mode. The inactivity timer can be stopped and re-started by the UE 102 whenever any activity occurs. The UE 102 can monitor the PDCCH 206 while the inactivity timer runs. After the inactivity timer expires, an optional period of short DRX cycles can occur. Short DRX cycles can be used initially after a period of inactivity because, in general, the probability of further activity occurring can be greater during the time window that immediately follows any previous activity. The probability of further activity tends to decrease as the period of inactivity increases. The eNodeB 110 can instruct the UE 102 whether to use a time period of short DRX cycles. When short DRX cycles are not used, a time period of long DRX cycles can start directly after a period of inactivity.

As illustrated in FIG. 4A, the C-DRX timing cycle 400 begins with active UL/DL transmissions when the UE 102 monitors the PDCCH 206, while in the RRC Connected State, in order to detect DL or UL grants assigned to the UE 102. When a valid grant is detected, the C-DRX Inactivity Timer is reset. Upon expiration of the C-DRX Inactivity Timer, the UE 102 can power down at least a portion of a receiver, as the UE 102 does not expect to receive a grant until a next on-duration period.

DRX modes include subframe offset values to distribute different users along a DRX cycle. A drxStartOffset command specifies a particular subframe on which a DRX Cycle starts. FIG. 4B illustrates subframe offset values, measured in milliseconds, per the 3GPP Technical Specification (TS) 36.321. The characteristic that a DRX cycle can start at different subframe numbers may allow for alternative techniques to determine the C-DRX warm-up period.

A C-DRX offset value can be used to obtain a starting subframe number for a DRX cycle. A DRX mode starts with a frame that satisfies certain conditions based on values for the number of subframes in a short DRX cycle and in a long DRX cycle. When the conditions are met, the UE 102 receives a set of current subframes, and then the UE 102 enables a power down mode for future subframes.

Every user can be assigned a random offset that can indicate on which subframe to start a DRX cycle. This random offset can indicate any subframe within the range of the DRX cycle length. Hence, different UEs 102 operating in a common area can be distributed randomly along a DRX cycle.

Figure 5A:
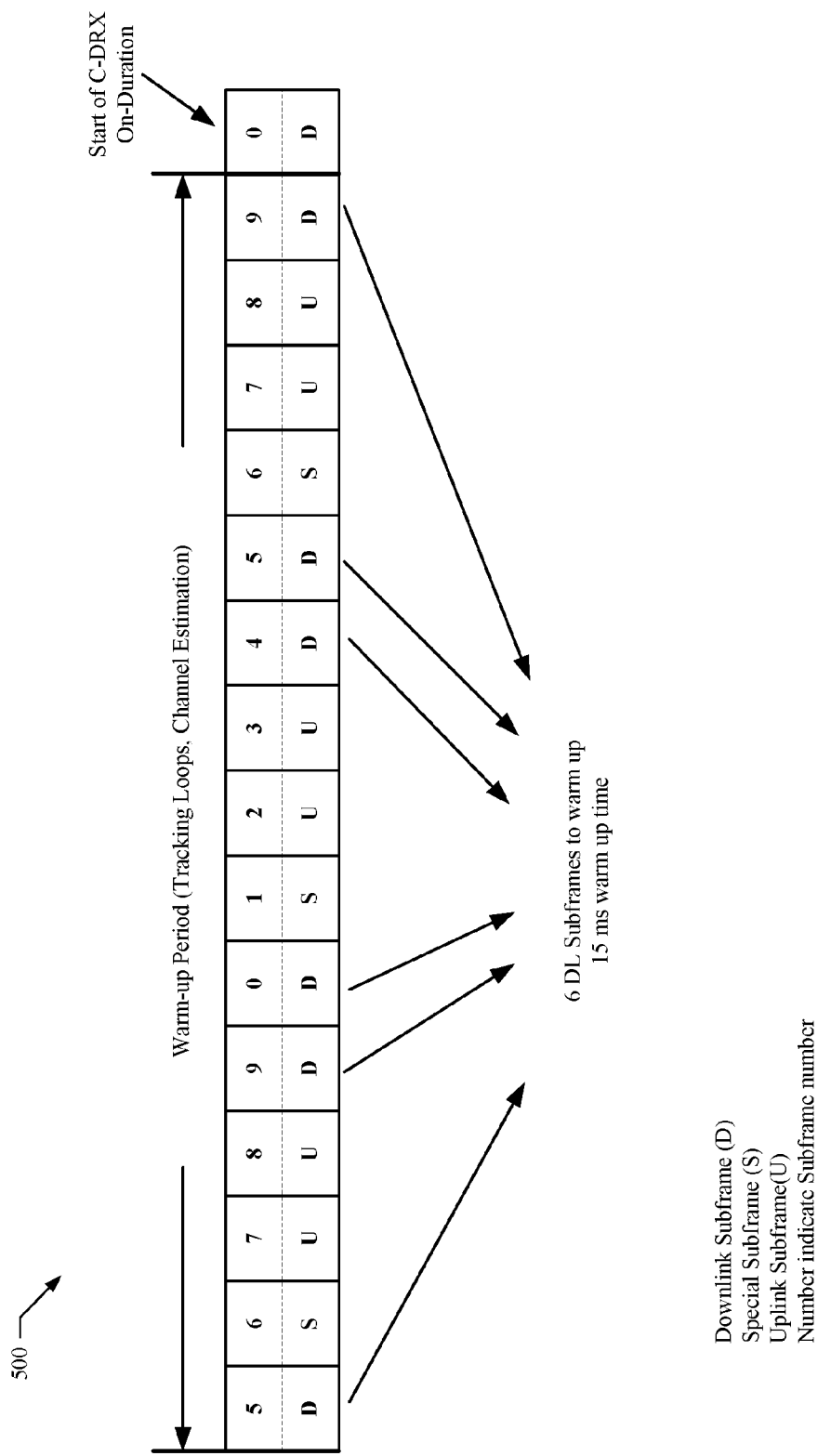
FIG. 5A illustrates a warm-up period for C-DRX operation in an LTE TDD wireless communication network, in accordance with some embodiments.

FIG. 5A illustrates a representative C-DRX warm-up period 500 for C-DRX operation in an LTE TDD wireless communication system. The C-DRX warm-up period 500 illustrated in FIG. 5A includes a subframe sequence consistent with UL/DL subframe configuration 1 as shown in FIG. 3B. With this particular UL/DL subframe configuration, the UE 102 can use a C-DRX warm-up period 500 that spans fifteen consecutive subframes and includes six DL subframes. In some embodiments, only DL subframes are considered to determine the length of a C-DRX warm-up period 500. For the UL/DL subframe configuration 1 illustrated in FIG. 5A, there are six DL subframes to support channel estimation and adaptive loop tracking during the C-DRX warm-up period 500. Immediately after the end of the C-DRX warm-up period 500, the C-DRX on-duration period starts. With fifteen subframes included in the C-DRX warm-up period 500, and each subframe spanning one ms (as shown in FIG. 2), the total time spanned by the C-DRX warm-up period 500 is fifteen milliseconds. It can be preferred to adapt the length of the C-DRX warm-up period, during C-DRX operation, rather than use a "conservative" or "fixed" number of DL subframes (such as six DL subframes as illustrated in FIG. 5A) to determine the length of the C-DRX warm-up period. Requiring a conservative, fixed number of DL subframes in a C-DRX warm-up period can result in a longer than necessary C-DRX warm-up period. By adjusting the number DL subframes used in a C-DRX warm-up period adaptively based on channel conditions and/or UL/DL subframe configurations, the UE 102 can reduce its power consumption.

The LTE TDD frame structure includes UL subframes, DL subframes and special (SSF) subframes. The LTE TDD specification defines seven distinct UL/DL subframe configurations that have different sequences of UL subframes, DL subframes, and special subframes. Whereas existing LTE TDD solutions specify a fixed length warm-up period, by analyzing the UL/DL subframe configurations and by measuring characteristics of the downlink channel, the UE 102 can select which subframes to use in order to adapt the length of the C-DRX warm-up period.

Three different techniques to adjust the length of C-DRX warm-up periods can be used including a "Reduced DL Subframe" (RDL) technique, a "special subframe with DL subframe" (dSSF) technique, and a "minimal channel estimation" (uDL) technique.

For the "Reduced DL Subframe" (RDL) technique, with more favorable channel conditions, such as low to medium Doppler shift values and medium to high SNR values, the C-DRX warm-up period can be reduced by using fewer DL subframes as channel conditions permit. When the UL/DL subframe configuration used by the UE 102 includes two or more consecutive DL subframes, and with favorable channel conditions, there can be a reduction in the total number of subframes in the C-DRX warm-up period. For example, per LTE TDD frame structure type 2, the number of subframes in a typical C-DRX warm-up period includes fifteen subframes, and for UL/DL subframe configuration 1, the fifteen subframes include six DL subframes. For low to medium Doppler shift values and medium to high SNR values, the number of subframes in the C-DRX warm-up period can be adjusted to fewer than fifteen subframes, e.g., by including only three DL subframes. Thus, with favorable channel conditions, (e.g., as indicated by a range of Doppler shift values and SNR values), and with a UL/DL sub-configuration that includes two or more consecutive DL subframes, the C-DRX warm-up period can be adapted accordingly.

For the "Special subframe with DL subframe" (dSSF) technique, with similar favorable channel conditions, e.g., low to medium Doppler shift values and medium to high SNR values, special subframes can be included, along with DL subframes, for channel estimation and adaptive loop tracking during the C-DRX warm-up period. The number of subframes in the C-DRX warm-up period can be adjusted when a special subframe immediately follows at least one downlink subframe. For a UL/DL subframe configuration 1, by using special subframes, e.g., for low to medium Doppler shift values and medium to high SNR values, the total number of subframes in the C-DRX warm-up period can be reduced to only five subframes, including two DL subframes and one special subframe that immediately follows one of the DL subframes.

For the "Minimal Channel Estimation (uDL)" technique, with high Doppler shift values and a high SNR values, the C-DRX warm-up period can also be adapted to use a minimal number of subframes. A DL subframe that follows an UL subframe can be referred to as a uDL subframe (or more generally, a sequence of one or more consecutive DL subframes that immediately follow an UL subframe can be referred to as a uDL sequence). With high values of Doppler shift and high SNR values, the C-DRX warm-up period can preferably be reduced to use as few subframes as possible. For example, use high SNR value DL subframes to adapt the tracking loops and update channel estimates quickly and immediately before the start of the "on" duration to accommodate rapidly changing communication channel conditions. Channel estimates derived from special subframes can be less reliable that those derived from DL subframes in high Doppler shift scenarios. It can prove beneficial to adjust the C-DRX warm-up period to not include DL subframes (or special subframes) that precede any UL subframes for scenarios with high SNR values and high Doppler shift values. Rather, the DL subframes that follow an UL subframe (or multiple UL subframes), i.e., a uDL sequence can be used for channel estimation and/or adaptive tracking loop updates. With current LTE TDD solutions, the number of subframes in a C-DRX warm-up period includes fifteen subframes with six DL subframes. For the UL/DL subframe configuration 1, by utilizing only a uDL sequence, the C-DRX warm-up period can be reduced from fifteen subframes to as short as a single subframe that immediately precedes the on-duration period. As previously discussed, each C-DRX cycle includes an "on" time period and an "off" time period. The "on" time period can also be referred to as an "on-duration" or an "on-duration period".

Figure 5B:
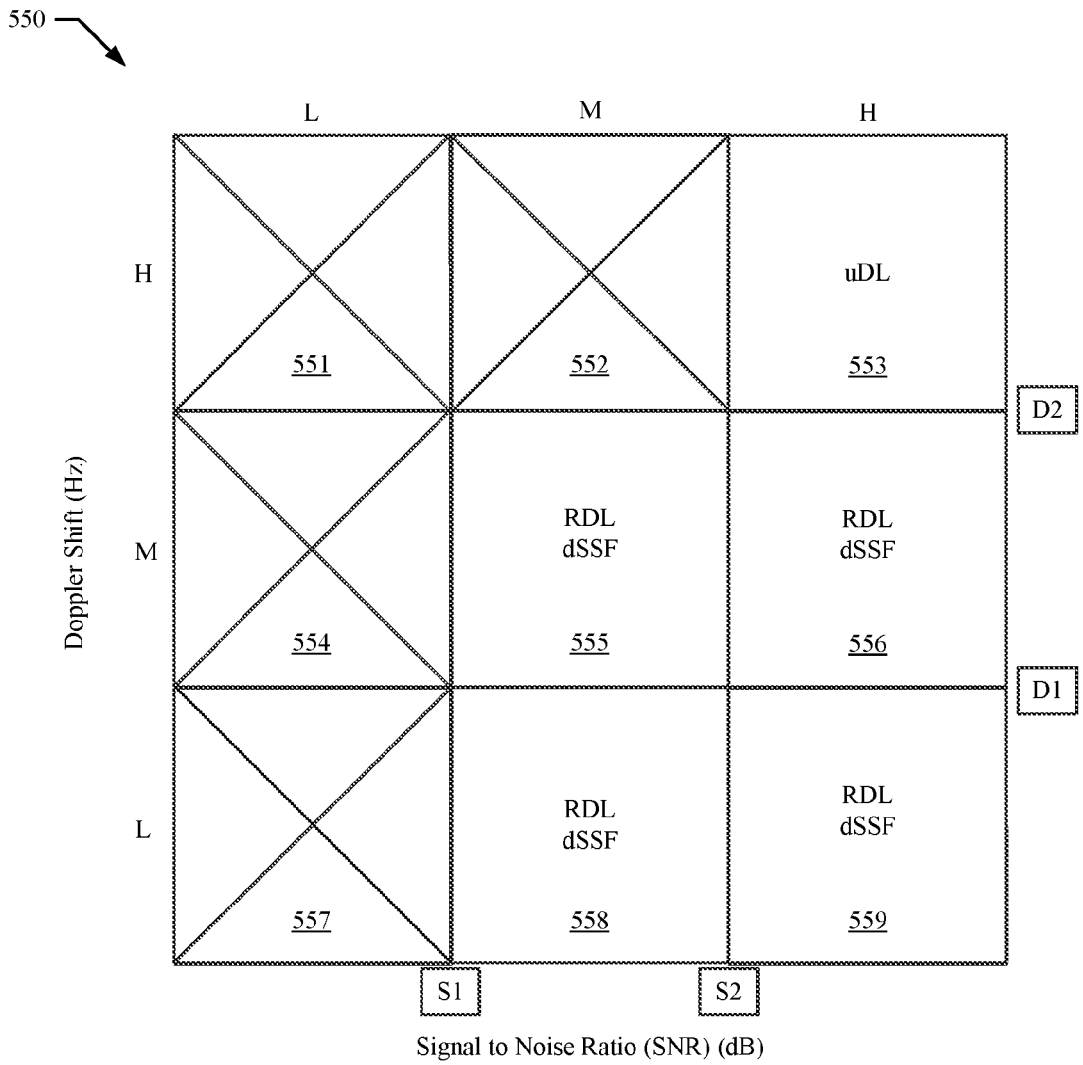
FIG. 5B illustrates a matrix indicating applications of three techniques to optimize power consumption by reducing a C-DRX warm-up period based on signal-to-noise ratio (SNR) and Doppler shift values, in accordance with some embodiments.

FIG. 5B illustrates a matrix 550 that delineates the three techniques for optimizing power consumption of the UE 102 by adapting the length of the C-DRX warm-up period 500. The three techniques shown in matrix 550 are based on measurements of Doppler shift and SNR. Per matrix 550, the Doppler shift and the SNR measurements can be categorized into three distinct levels: High (H), Medium (M) and Low (L). A first threshold value can distinguish between the Medium and Low levels, e.g., the SNR threshold value S1 can separate a "low" SNR region from a "medium" SNR region, while the Doppler shift threshold value D1 can divide a "low" Doppler shift region from a "medium" Doppler shift region. Similarly, a second threshold value can differentiate between the M level and the H level, e.g., the SNR threshold value S2 can separate the "medium" SNR region from a "high" SNR region, and the Doppler shift threshold value D2 can divide the "medium" Doppler shift region from the "high" Doppler shift region.

The techniques for C-DRX warm-up reduction shown in FIG. 5B include the Reduced DL Subframe (RDL) technique, the special Subframe with DL subframe (dSSF) technique, and the Minimal Channel Estimation (uDL) technique. As illustrated, the RDL technique, the dSSF technique, and the uDL technique can be used for different ranges of Doppler shift and SNR (as measured and/or estimated by the UE 102.). A nominal value for a "medium" level of Doppler shift can be less than or equal to 70 Hz, and a "low" level of Doppler shift can be in a range from 5 Hz to 20 Hz. A representative high level of SNR can be 10 dB or more.

As illustrated in FIG. 5B, the matrix 550 includes nine regions of operation 551-559 based on different ranges of SNR and Doppler shift. The RDL and dSSF techniques can be implemented when (i) SNR values are greater than the S1 SNR threshold value and (i) Doppler shift values are less than the D2 Doppler shift threshold value. There are four regions of operation in which the RDL and dSSF techniques can be used, indicated as regions 555, 556, 558 and 559. The uDL technique can be used when (i) SNR values exceed the S2 SNR threshold value and (ii) Doppler shift values exceed the D2 Doppler shift threshold value. There can be one region of operation that uses the uDL technique, namely region mode 553. Additionally, matrix 550 indicates that regions 551, 552, 554 and 557 cannot support use of the three techniques to reduce the C-DRX warm-up period, in which case a "normal" unreduced C-DRX warm-up period can be used.

Figure 6:
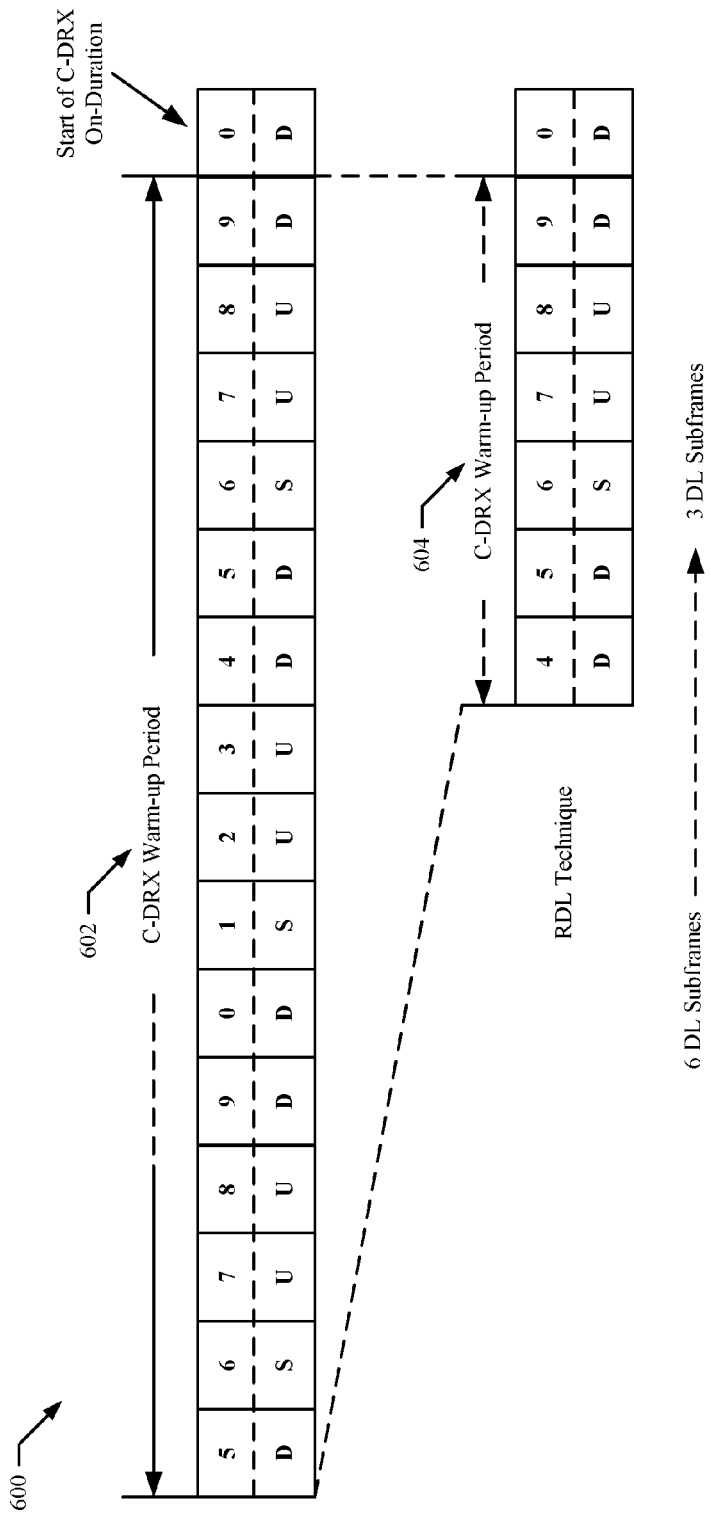
FIG. 6 illustrates a power optimization technique for C-DRX operation in an LTE TDD wireless communication network that adapts a C-DRX warm-up period based on a sequence of consecutive downlink subframes, in accordance with some embodiments.

FIG. 6 illustrates a set of diagrams 600 of a representative technique for power optimization during C-DRX operation in LTE TDD wireless communication systems. In particular, the RDL technique illustrated in FIG. 6 reduces a fifteen subframe "normal" C-DRX warm-up period 602 to a six subframe "reduced" C-DRX warm-up period 604 based on using a sequence of two or more consecutive downlink subframes. The C-DRX warm-up period 602 illustrated uses a UL/DL subframe configuration 1. As previously noted, typical existing LTE solutions use an LTE TDD C-DRX warm-up period of fifteen subframes including six DL subframes for channel estimation and adaptive loop tracking. The "normal" full-length C-DRX warm-up period 602 can be reduced to a shorter length C-DRX warm-up period 604 when communication channel conditions allow, e.g., based on measurements of Doppler shift and SNR. For instance, with lower Doppler shift values and higher SNR values, the fifteen-subframe C-DRX warm-up period 602 can be reduced to a six-subframe C-DRX warm-up period 604. Per FIG. 6, the reduced length C-DRX warm-up period 604 for UL/DL subframe configuration 1 spans six subframes including three DL subframes. The positioning of the three DL subframes (relative to the start of the subsequent "on" period), a lower level of Doppler shift (which can indicate lower time variation of channel characteristics), and a higher level of SNR (which can indicate fewer DL subframes are required to achieve accurate channel estimates and to update tracking loops) allow for the reduction in the total number of subframes in the C-DRX warm-up period 604.

More generally, as indicated in FIG. 5B, the RDL technique can be implemented when (i) the Doppler shift value is within a "medium" level range or within a "low" level range and (ii) the SNR value is within a "medium" level range or within a "high" level range. Although the example shown in FIG. 6 is based on UL/DL subframe configuration 1, other UL/DL subframe configurations can also benefit from the RDL technique to reduce the length of the C-DRX warm-up period.

In summary, the RDL technique can be used when (i) the UL/DL subframe configuration includes two or more consecutive DL subframes and (ii) the Doppler shift and SNR values indicate operation in one of the four regions shown in FIG. 5B, namely regions 555, 556, 558 and 559.

Figure 7:
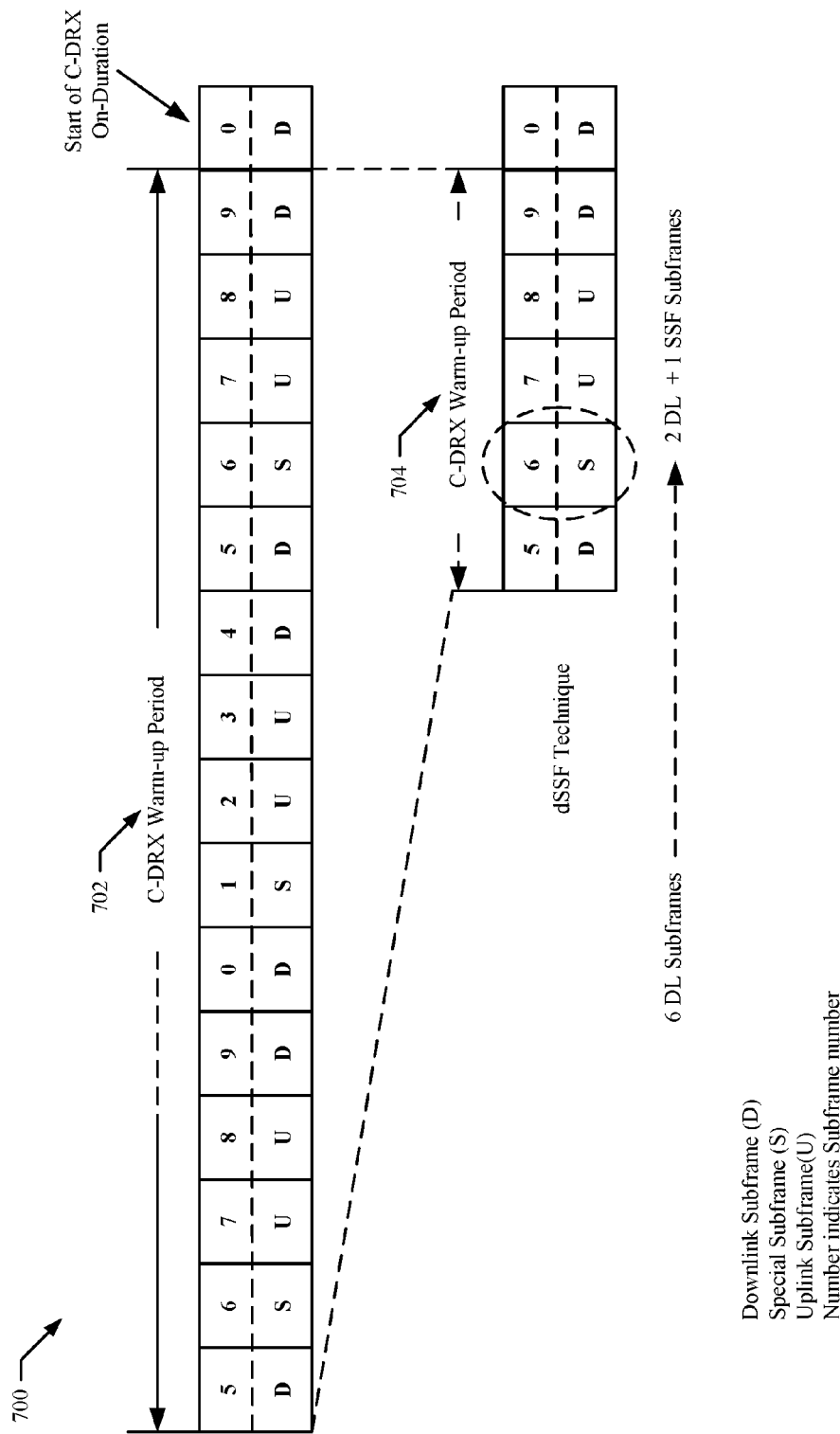
FIG. 7 illustrates a power optimization technique for C-DRX operation in an LTE TDD wireless communication network based on characteristics of special subframes, in accordance with some embodiments.

FIG. 7 illustrates a set of subframe diagrams 700 of a representative technique for power optimization during C-DRX operation in LTE TDD wireless communication systems. In particular, the dSSF technique illustrated in FIG. 7 reduces a fifteen-subframe "normal" C-DRX warm-up period 702 to a five-subframe "reduced" C-DRX warm-up period 704 based on using special subframes. FIG. 7 illustrates a representative embodiment of the dSSF technique, when applied to reducing the C-DRX warm-up period 702 for a UL/DL subframe configuration 1. As previously noted, existing LTE solutions use an LTE TDD C-DRX warm-up period of fifteen subframes including six DL subframes during the C-DRX warm-up period for channel estimate and adaptive loop tracking. The C-DRX warm-up period can be adjusted based on measured Doppler shift and SNR values.

For example, in a low to mid Doppler shift scenario, special subframes (and not just DL subframes) can be considered for channel estimation and adaptive tracking loops. As with the RDL technique, the dSSF technique includes fewer DL subframes during the C-DRX warm-up period to reduce the length of the C-DRX warm-up period. The dSSF technique also includes at least one special subframe to further reduce the C-DRX warm-up period. As indicated in FIG. 7, by starting the reduced C-DRX warm-up period 704 at DL subframe 5 and including special subframe 6 in the channel estimation and tracking loops, the C-DRX warm-up period 704 spans only five subframes (rather than six subframes as provided by the RDL technique). For the same UL/DL subframe configuration (i.e., configuration 1), by utilizing at least one special subframe, e.g., in place of a DL subframe, the total number of subframes in the C-DRX warm-up period is reduced. The special subframe can be used when SNR values exceed a low SNR threshold value and the UL/DL subframe configuration includes a special subframe immediately adjacent to a DL subframe. In addition, the dSSF technique can require low to mid Doppler shift values that permit the use of DL subframes and special subframes that are separated by UL subframes (i.e., the channel characteristics cannot be highly time varying). The total number of subframes in the reduced length C-DRX warm-up period 704 spans five subframes, including two DL subframes and one special subframe, with the special subframe immediately following one of the DL subframes. Although the example illustrated in FIG. 7 is based on UL/DL subframe configuration 1, other UL/DL subframe configurations can also benefit from the dSSF technique to adjust the length of a C-DRX warm-up period.

In summary, the dSSF technique can be implemented when the UL/DL subframe configuration includes at least one DL subframe immediately preceding a special subframe. The special subframe can be included for channel estimation and adaptive tracking loops with the DL subframes when the Doppler shift and SNR values indicate operation in one of the four regions shown in FIG. 5B, namely regions 555, 556, 558, and 559.

Figure 8:
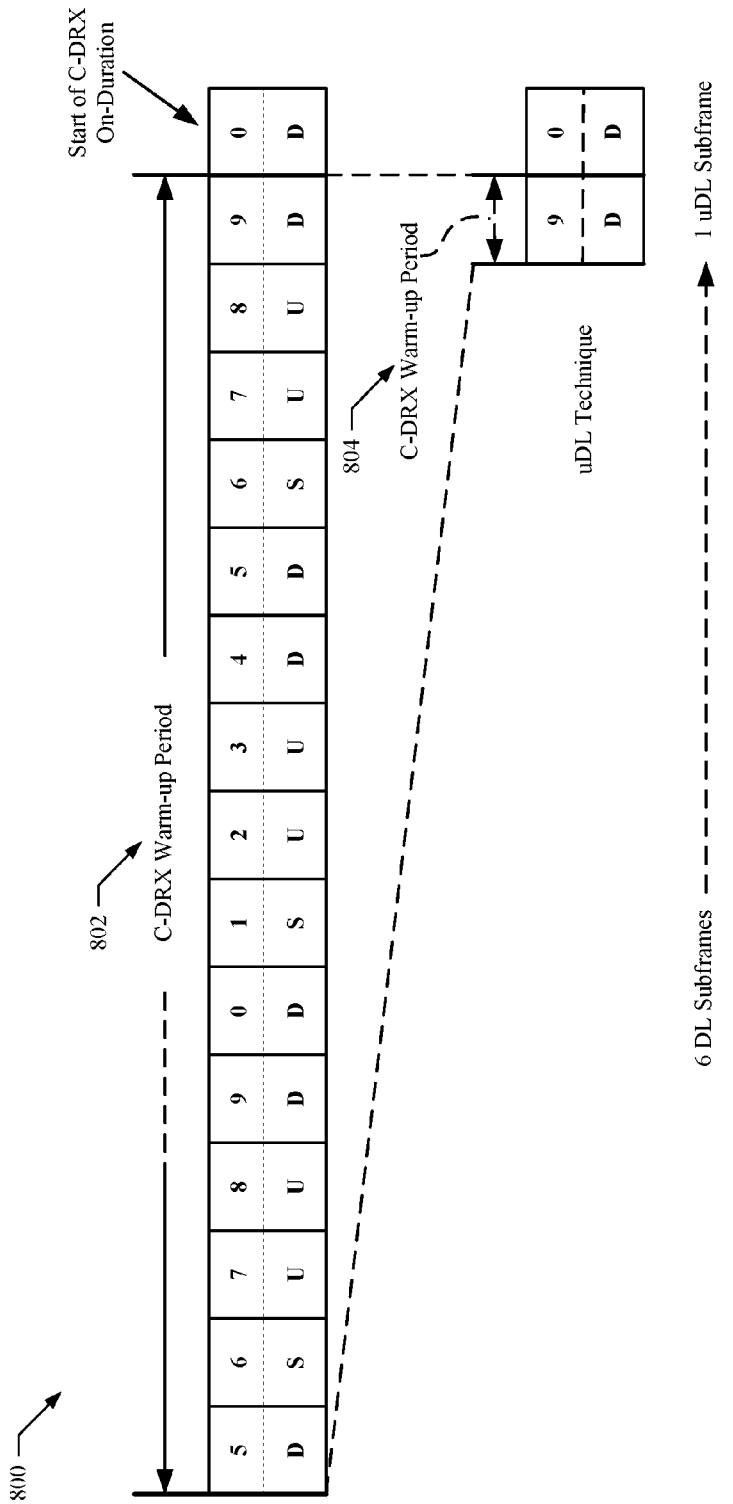
FIG. 8 illustrates a power optimization technique for C-DRX operation in an LTE TDD wireless communication network based on minimal channel estimation, in accordance with some embodiments.

FIG. 8 illustrates a set of diagrams 800 of a representative technique for power optimization during C-DRX operation in LTE TDD wireless communication systems. In particular, the uDL technique illustrated in FIG. 8 reduces a fifteen-subframe "normal" C-DRX warm-up period 802 to a single-subframe "reduced" C-DRX warm-up period 804 based on using a minimal number of subframes for channel estimation and adaptive loop tracking. FIG. 8 illustrates a representative example embodiment of the uDL technique. The C-DRX warm-up period 802 illustrates uses an UL/DL subframe configuration 1. As previously noted, typical existing LTE solutions use an LTE TDD C-DRX warm-up period of fifteen subframes including six DL subframes for channel estimation and adaptive loop tracking. One or more DL subframes that follow an UL subframe can be referred to as a uDL sequence. Under high Doppler scenarios, when the communication channel is rapidly time varying, the C-DRX warm-up period can preferably be reduced to using the fewest number of subframes possible based on measured SNR values and using subframes as close as possible in time to the start of the "on" period. For high Doppler shift values, special subframes can be less reliable, and thus can be excluded. With the uDL technique, under high Doppler shift conditions, it is preferred to not use subframes that are separated from the end of the C-DRX warm-up period (e.g., subframes that occur earlier in the warm-up period preceding any UL subframe gaps) for channel estimates and adaptive loop tracking. With UL/DL subframe configuration 1, by utilizing the uDL technique, the C-DRX warm-up period can be reduced to a single DL subframe, as illustrated by the C-DRX warm-up period 804 in FIG. 8.

The uDL technique can be used when one or more DL subframes immediately follow at least one UL subframe and the one or more DL subframes are ideally positioned at the end of the C-DRX warm-up period immediately preceding the start of the C-DRX "on" period. When measured or estimated Doppler shift values are "high" and measured or estimated SNR values are also "high" as indicated for region 553 of the matrix 550 of FIG. 5B, the uDL technique can be used to adjust the C-DRX warm-up period to the fewest number of subframes while also providing for reliable channel estimation and adaptive loop tracking. Although the representative example embodiment shown in FIG. 8 is based on UL/DL subframe configuration 1, other UL/DL subframe configurations can also benefit from the uDL technique to determine the length of a C-DRX warm-up period. For example, UL/DL configuration 2 includes a sequence of two DL subframes that immediately follow a UL subframe and immediately precede the "on" duration. Depending on measured SNR values, which can influence the number of DL subframes required for channel estimation and adaptive loop tracking, the C-DRX warm-up period can be reduced to only use one DL subframe or only two DL subframes.

Reviewing the UL/DL subframe configurations summarized in Table 350 of FIG. 3B, one can conclude that all UL/DL subframe configurations can take advantage of the three different techniques described herein, except that UL/DL subframe configuration 0 cannot use the RDL technique, as the UL/DL subframe configuration 0 lacks two consecutive DL subframes. The UL/DL subframe configuration 0, however, can support use of the dSSF technique, as there are two positions in the sequence of subframes in which a special subframe immediately follows a DL subframe.

Figure 9:
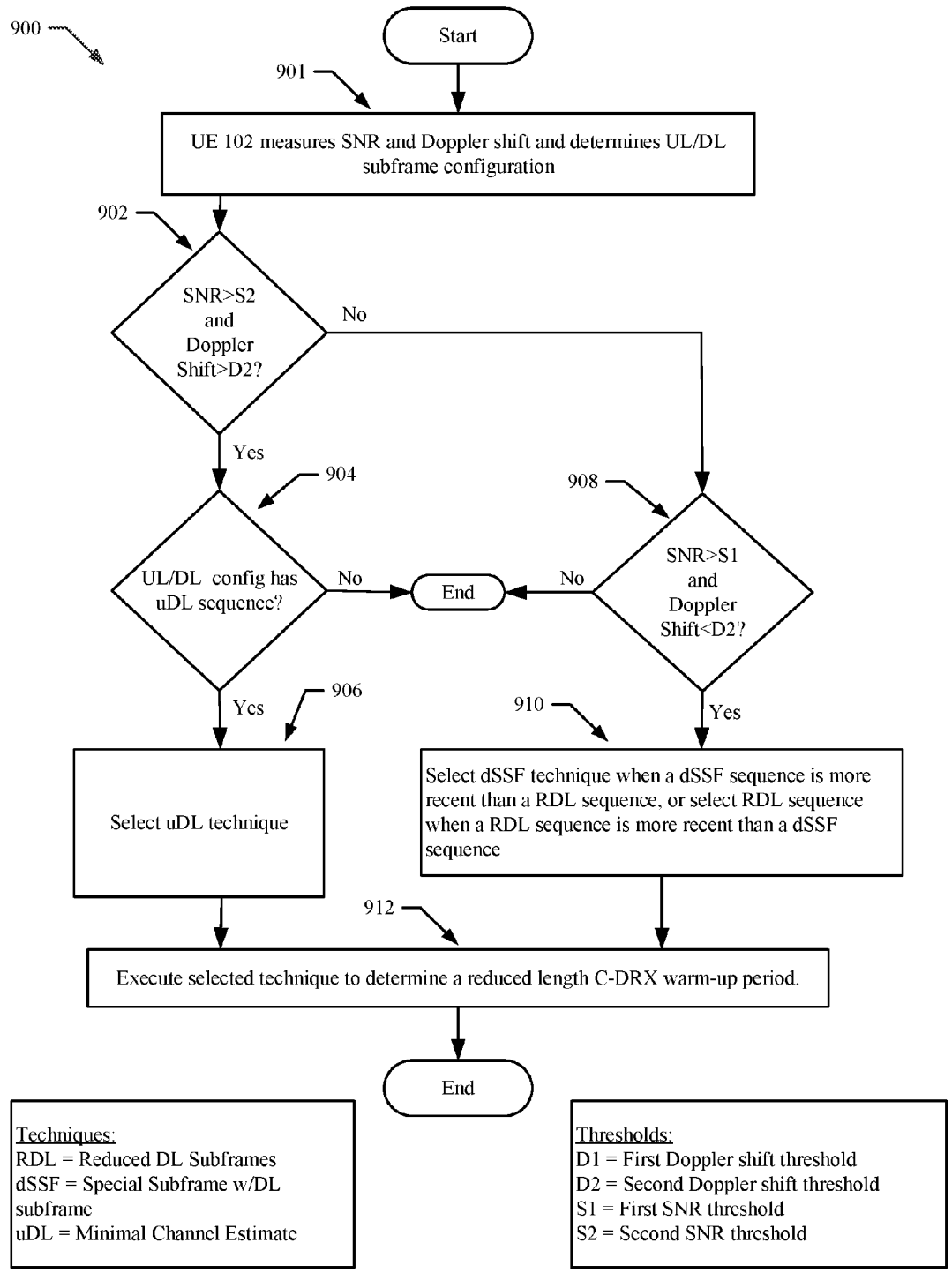
FIG. 9 illustrates a flowchart for determining a power optimization technique to adapt a C-DRX warm-up time period based on measurements of an SNR, a Doppler shift, and a subframe configuration, in accordance with some embodiments.

FIG. 9 illustrates a flowchart 900 for selecting and executing a method to determine the length of a C-DRX warm-up period 500 for an LTE TDD wireless communication system. The method is based on comparing SNR measurements with one or more SNR thresholds and comparing Doppler shift measurements with one or more Doppler shift thresholds. As previously discussed, S1 and S2 can indicate a first SNR threshold value and a second SNR threshold value, respectively, where S1<S2. Similarly, D1 and D2 can indicate a first Doppler shift threshold value and a second Doppler shift threshold value, respectively, where D1<D2.

In step 901, the UE 102 measures (or estimates) an SNR value and a Doppler shift value and determines an UL/DL subframe configuration in use. In step 902, the UE 102 determines whether the measured (or estimated) SNR value exceeds a second SNR threshold value S2 and whether the measured (or estimated) Doppler shift value exceeds a second Doppler shift threshold value D2. When either the SNR value or the Doppler shift value does not satisfy the criteria tested in step 902, the UE 102 proceeds to step 908. When the criteria tested in step 902 are satisfied, the UE 102 subsequently determines in step 904 whether the UL/DL subframe configuration includes a uDL sequence, i.e., that one or more downlink subframes immediately follow an uplink subframe. When the test in step 904 is not satisfied, the method 900 ends. When the test in step 904 is satisfied, then in step 906 the UE 102 selects the uDL technique (i.e., operating in region 553 of matrix 550 illustrated in FIG. 5B) to determine the C-DRX warm-up period 802. The uDL technique uses at least one DL subframe that follows a UL subframe. Per Table 350, all UL/DL subframe configurations support use of the uDL technique. When the UL/DL subframe configuration includes more than one uDL sequence, the uDL sequence that occurs closest to the start of the "on" period that follows the C-DRX warm-up period is used.

When the test in step 902 is not satisfied, then in step 908 the UE 102 determines whether the measured (or estimated) SNR measurement exceeds a first SNR threshold value S1 and whether the measured (or estimated) Doppler shift is less than a second Doppler shift threshold value S2. When the test in step 908 is not satisfied, the method 900 ends. When the test in step 908 is satisfied, then in step 910 the UE 102 selects between using the dSSF technique and the RDL technique based on whichever sequence (dSSF or RDL) occurs latest in the unreduced "normal" C-DRX warm-up period. The UE 102 selects the dSSF technique when a dSSF sequence of the UL/DL subframe configuration occurs later in the C-DRX warm-up period than any RDL sequence. Alternatively, the UE 102 selects the RDL technique when an RDL sequence occurs later in the C-DRX warm-up period than any dSSF sequence. More formally, the UE 102 selects either a special subframe with a downlink subframe (dSSF) technique for determining a reduced C-DRX warm-up period when a special subframe with a downlink subframe (dSSF) sequence of subframes is the latest occurring set of subframes compared against a reduced downlink subframe (RDL) sequence of subframes; or the UE 102 selects a reduced downlink subframe (RDL) technique for determining a reduced C-DRX warm-up period when the reduced downlink subframe (RDL) sequence of subframes is the latest occurring set of subframes compared against a special subframe with a downlink subframe (dSSF) sequence of subframes. In step 912, based on the technique selected in steps 906 and 910, the UE 102 executes the selected technique to determine a reduced length C-DRX warm-up period.

The reduced downlink subframe (RDL) technique requires two or more consecutive downlink subframes in the LTE TDD frame for the UL/DL subframe configuration in use. The special subframe with a downlink subframe (dSSF) sequence requires a special subframe immediately follow one or more downlink subframes. Per Table 350, all the UL/DL subframe configurations, for existing LTE TDD wireless communication protocols, support a reduced downlink subframe (RDL) sequence of subframes, except for UL/DL subframe configuration 0. Per Table 350, all the UL/DL subframe configurations support a dSSF sequence of subframes and a uDL sequence of subframes. As shown in FIG. 5, based on ranges of SNR values and ranges of Doppler shift values, the RDL technique and the dSSF technique can be supported when the UE 102 operates in regions 555-556 and 558-559 of matrix 550. The uDL technique can apply when the UE 102 operates in region 553.

Figure 10:
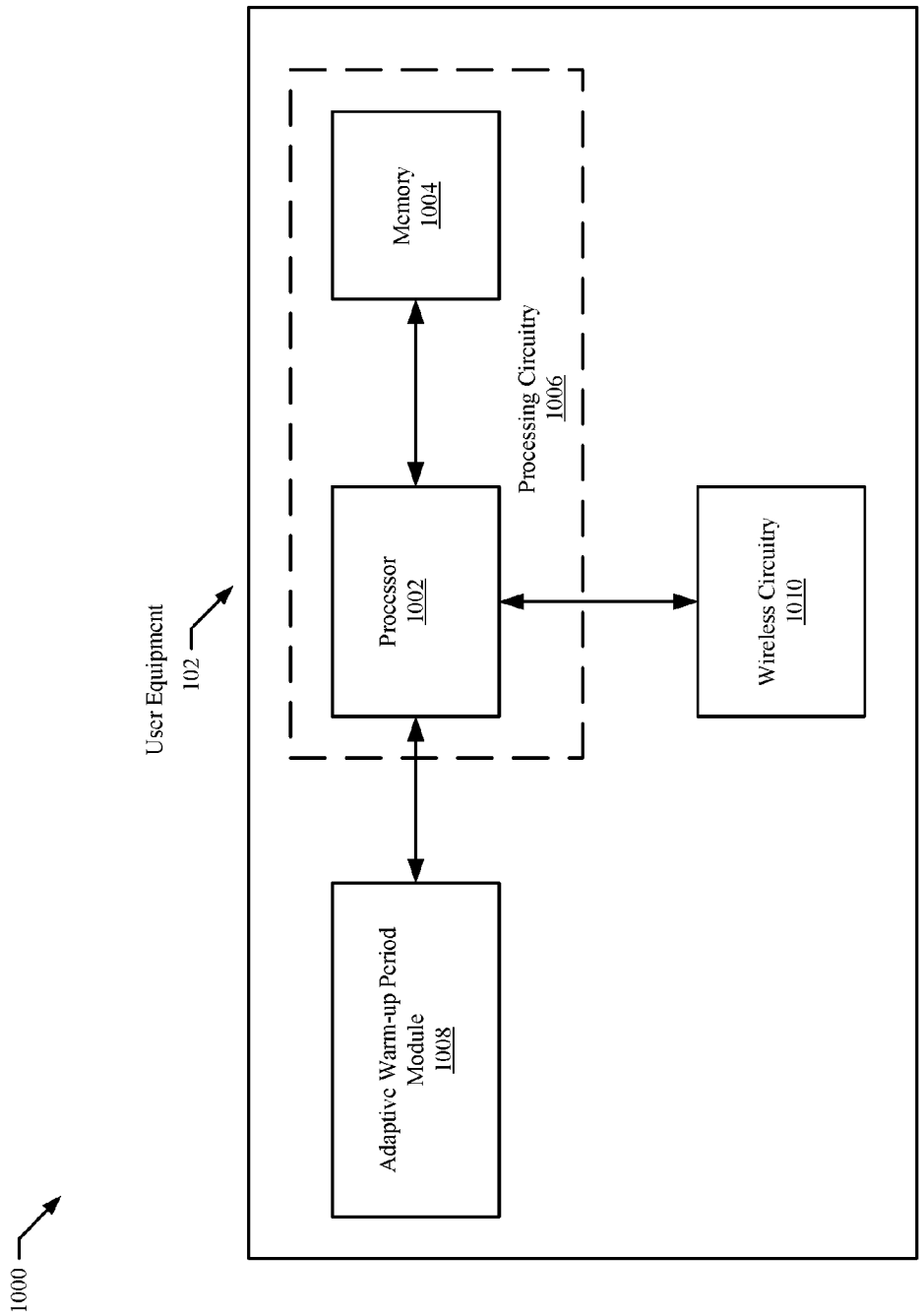
FIG. 10 illustrates a block diagram of a wireless communication device configurable to optimize C-DRX operation in an LTE TDD wireless communication network, in accordance with some embodiments.

FIG. 10 illustrates a block diagram of an apparatus 1000 that can be implemented as part of the UE 102, in accordance with some embodiments. The apparatus 1000 of FIG. 10 can be configured to adapt the length of a C-DRX warm-up period to reduce power consumption by the UE 102, in accordance with some embodiments. It will be appreciated that the components, devices or elements illustrated in and described with respect to FIG. 10 may not be mandatory and thus some may be omitted in certain embodiments. Additionally, some embodiments can include further or different components, devices or elements beyond those illustrated in and described with respect to FIG. 10.

In some embodiments, the apparatus 1000 can include processing circuitry 1006 that is configurable to perform actions in accordance with one or more embodiments disclosed herein. In this regard, the processing circuitry 1006 can be configured to perform and/or control performance of one or more functionalities of the apparatus 1000 in accordance with various embodiments, and thus can provide means for performing functionalities of the apparatus 1000 in accordance with various embodiments. The processing circuitry 1006 can be configured to perform data processing, application execution and/or other processing and management services according to one or more embodiments.

In some embodiments, the apparatus 1000 or a portion(s) or component(s) thereof, such as the processing circuitry 1006, can include one or more chipsets, which can each include one or more chips. The processing circuitry 1006 and/or one or more further components of the apparatus 1000 can therefore, in some instances, be configured to implement an embodiment on a chipset including one or more chips. In some embodiments in which one or more components of the apparatus 1000 are embodied as a chipset, the chipset can be capable of enabling a computing device, e.g., the UE 102, to operate in the LTE wireless network 100 when implemented on or otherwise operably coupled to the computing device, e.g., the UE 102. Thus, for example, one or more components of the apparatus 1000 can provide a chipset configured to enable a computing device to communicate using one or more cellular wireless technologies. In some embodiments, the processing circuitry 1006 can include a processor 1002 and, in some embodiments, such as that illustrated in FIG. 10, can further include memory 1004. The processing circuitry 1006 can be in communication with or otherwise control wireless circuitry 1010 and/or an adaptive warm-up period module 1008.

The processor 1002 can be embodied in a variety of forms. For example, the processor 1002 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 1002 can include multiple processors. The multiple processors can be in operative communication with each other and can be collectively configured to perform one or more functionalities of the apparatus 1000 as described herein. In some embodiments, the processor 1002 can be configured to execute instructions that can be stored in the memory 1004 or that can be otherwise accessible to the processor 1002. As such, whether configured by hardware or by a combination of hardware and software, the processor 1002 can be capable of performing operations according to various embodiments while configured accordingly.

In some embodiments, the memory 1004 can include one or more memory devices. Memory 1004 can include fixed and/or removable memory devices. In some embodiments, the memory 1004 can provide a non-transitory computer-readable storage medium that can store computer program instructions that can be executed by the processor 1002. In this regard, the memory 1004 can be configured to store information, data, applications, instructions and/or the like for enabling the apparatus 1000 to carry out various functions in accordance with one or more example embodiments. In some embodiments, the memory 1004 can be in communication with one or more of the processor 1002, wireless circuitry 1010, or adaptive warm-up period module 1008 via one or more busses for passing information among components of the apparatus 1000.

The apparatus 1000 can further include wireless circuitry 1010. The wireless circuitry 1010 can be configured to enable the apparatus 1000 to send wireless signals to and receive signals in accordance with one or more wireless networking technologies. As such, the wireless circuitry 1010 can enable the apparatus 1000 to send signals to and receive signals from an eNodeB 110 (or an equivalent) of a wireless network, e.g., the LTE wireless network 100. In some embodiments, the wireless circuitry 1010 includes hardware and/or software modules to perform operations to convert digital data to and/or from analog wireless radio frequency waveforms.

The apparatus 1000 can further include an adaptive warm-up period module 1008. The adaptive warm-up period module 1008 can be embodied as various means, such as circuitry, hardware, a computer program product including computer readable program instructions stored on a computer readable medium (for example, the memory 1004) and executed by a processing device (for example, the processor 1002), or some combination thereof. In some embodiments, the processor 1002 (or the processing circuitry 1006) can include, or otherwise control the adaptive warm-up period module 1008. The adaptive warm-up period module 1008 can be configured to determine an adaptive warm-up period in accordance with one or more embodiments disclosed herein, for example as part of a channel estimation and/or adaptive tracking loop process that the UE 102 can execute before the start of an "on" period following an "off" period while operating in a C-DRX mode. For example, the adaptive warm-up period module 1008 can be configured to measure and/or estimate SNR values and Doppler shift values in an LTE TDD wireless system as part of an adaptive warm-up period determination.

Apparatus 1000 can be configured to reduce power consumption in a connected discontinuous reception (C-DRX) mode by adapting the length of a C-DRX warm-up period of a UE 102 while connected to a Long Term Evolution Time Division Duplex (LTE TDD) wireless network. Within apparatus 1000, wireless circuitry 1010 can be configured to receive and transmit multiple subframes from the LTE TDD wireless network, and the multiple subframes can include a sequence of one or more downlink subframes, one or more uplink subframes, and one or more special subframes that repeat according to an uplink/downlink (UL/DL) subframe configuration or pattern. The adaptive warm-up period module 1008, coupled to processing circuitry 1006, is configured to measure and/or estimate signal-to-noise ratio (SNR) values and Doppler shift values of a communication channel between the UE 102 and the LTE TDD wireless network. The processing circuitry 1006, which is also coupled to the wireless circuitry 1010, determines an LTE TDD uplink/downlink (UL/DL) subframe configuration in use and selects a technique to determine a number of subframes in a C-DRX warm-up period based on (i) measured (or estimated) SNR values compared against one or more SNR thresholds and also based on measured (or estimated) Doppler shift values compared against one or more Doppler shift thresholds and (ii) the UL/DL subframe configuration in use. The adaptive warm-up period module 1008 can be configured also to execute the selected technique to determine the length of a C-DRX warm-up period.

When the measured (or estimated) SNR exceeds a first SNR threshold value and the measured (or estimated) Doppler shift value is less than a second Doppler shift threshold, the processing circuitry 1006 selects either a special subframe with a downlink subframe (dSSF) technique or a reduced downlink subframe (RDL) technique for adapting the length of a C-DRX warm-up period. The processing circuitry 1006 selects between the various available techniques based on the particular pattern of subframes in the UL/DL configuration in use and the measured (or estimated) SNR and Doppler shift values as described hereinabove.

In summary, a method for reducing power consumption in a user equipment (UE) 102, which operates in a connected discontinuous reception (C-DRX) mode in communication with a Long Term Evolution Time Division Duplex (LTE TDD) wireless network, adapts the length of a C-DRX warm-up period by executing the following: (1) receiving and transmitting multiple subframes from the LTE TDD wireless network, the multiple subframes including a sequence of one or more downlink subframes, one or more uplink subframes, and one or more special subframes; (2) determining an LTE TDD uplink/downlink (UL/DL) subframe configuration in use; (3) measuring and/or estimating a signal-to-noise ratio (SNR) value and a Doppler shift value of a communication channel between the UE 102 and the LTE TDD wireless network; (4) obtaining a first SNR threshold value and a second SNR threshold value, the first SNR threshold value being less than the second SNR threshold value; (5) obtaining a first Doppler shift threshold value and a second Doppler shift threshold value, the first Doppler shift threshold value being less than the second Doppler shift threshold value; (6) selecting a technique to determine the number of subframes in a C-DRX warm-up period based on comparing the measured (or estimated) SNR values to the SNR threshold values, comparing the measured (or estimated) Doppler shift values to the Doppler shift threshold values, and on the UL/DL subframe configuration in use; and (7) executing the selected technique to determine a length of the C-DRX warm-up period.

In some embodiments, the method includes, when the measured (or estimated) SNR value exceeds the first SNR threshold and the measured Doppler shift value is less than a second Doppler shift threshold, the UE 102 selecting either a special subframe with a downlink subframe (dSSF) technique for determining the length of the C-DRX warm-up period 704 or a reduced downlink subframe (RDL) technique. When the UL/DL subframe configuration includes a special subframe with a downlink subframe (dSSF) sequence of subframes occurring after any reduced downlink subframe (RDL) sequence of subframes, the UE 102 selects the dSSF technique. Alternatively, the UE 102 selects the reduced downlink subframe (RDL) technique for determining the length of the reduced C-DRX warm-up period 604 when a reduced downlink subframe (RDL) sequence of subframes occurs after any special subframe with a downlink subframe (dSSF) sequence of subframes in the UL/DL subframe configuration in use.

Another technique to determine the number of subframes included in a C-DRX warm-up period includes the following: (1) selecting at least one downlink subframe; (2) starting the C-DRX warm-up period on a downlink subframe; and (3) using fewer than all downlink subframes available in an "unreduced" C-DRX warm-up period. In some embodiments, when a measured or estimated SNR value is less than a first SNR threshold value, the length of the C-DRX warm-up period is not reduced, e.g., uses fifteen subframes, a default number of subframes, or as many subframes as required to include a default number of DL subframes in the C-DRX warm-up period. In some embodiments, when (i) the SNR value is less than a second SNR threshold value and exceeds the first SNR threshold value, and (ii) the Doppler shift value is greater than a Doppler shift threshold value, the length of the C-DRX warm-up period is not reduced, e.g., includes fifteen subframes, or a default number of subframes, or as many subframes as required to include a default number of DL subframes in the C-DRX warm-up period.

In some embodiments, a method to determine the number of subframes in a C-DRX warm-up period includes the UE 102 selecting a minimal channel estimation (uDL) technique for determining a length of a reduced C-DRX warm-up period when (i) the measured (or estimated) SNR value exceeds a second SNR threshold, (ii) the measured (or estimated) Doppler shift value exceeds a second Doppler shift threshold, and (iii) the UL/DL subframe configuration includes a minimal channel estimation (uDL) sequence of subframes.

In some embodiments, a method to determine the number of subframes in a C-DRX warm-up period includes the UE 102 selecting a portion of a subframe sequence that has at least two downlink subframes and/or a portion of the subframe sequence that includes at least two subframes that are a combination of downlink subframes and/or special subframes.

In some embodiments, a wireless communication device can be configured to reduce power consumption while operating in a C-DRX mode by adjusting a length of a C-DRX warm-up period during communication with an LTE TDD wireless network. The wireless communication device includes: 1) wireless circuitry configured to receive from and transmit to the LTE TDD wireless network multiple subframes including a sequence of one or more downlink subframes, one or more uplink subframes, and one or more special subframes; 2) an adaptive warm-up period module coupled to processing circuitry and configured to cause the wireless communication device to measure an signal-to-noise ratio (SNR) value and a Doppler shift value of a communication channel between the wireless communication device and the LTE TDD wireless network; and 3) the processing circuitry coupled to the wireless circuitry. The processing circuitry can be configured to: (a) compare the measured SNR value to one or more SNR threshold values; (b) compare the measured Doppler shift value to one or more Doppler shift threshold values; and (c) adjust the C-DRX warm-up period based on the comparison of the measured SNR values to the one or more SNR threshold values and the comparison of the measured Doppler shift value to the one or more Doppler shift threshold values.

In some embodiments, the processing circuitry of the wireless communication device can be further configured to determine an uplink/downlink (UL/DL) subframe configuration and select a technique to determine a number of subframes to include in the C-DRX warm-up period based on: (i) the measured SNR values, (ii) the measured Doppler shift values, (iii) the one or more SNR threshold values, (iv) the one or more Doppler shift threshold values and (v) the determined UL/DL subframe configuration. The processing circuitry of the wireless communication device can then cause the wireless communication device to execute the selected technique to adjust the length of the C-DRX warm-up period accordingly.

In some embodiments, a non-transitory computer readable storage medium includes computer program code that when executed by one or more processors implemented on a user equipment (UE) operating in a power saving mode in communication with a time division duplex (TDD) wireless network causes the UE to determine a length of an "off to on" transition period. The UE performs the following steps: 1) receiving from and transmitting to the TDD wireless network a frame pattern including a sequence of one or more downlink subframes, one or more uplink subframes, and one or more special subframes; 2) determining a TDD uplink/downlink (UL/DL) subframe configuration based on the frame pattern, the UL/DL subframe configuration defining a particular sequence of DL subframes, UL subframes and special subframes; 3) measuring a signal-to-noise ratio (SNR) value and a Doppler shift value of a communication channel between the UE and the TDD wireless network; 4) selecting a technique to determine a number of subframes in the "off to on" transition period based on the measured SNR value, the measured Doppler shift value, and the UL/DL subframe configuration; and 5) executing the selected technique to determine the length of the "off to on" transition period. In some embodiments, the UE reduces power consumption during periods of data inactivity by discontinuing some receiver and transmitter functions during an off period and by adaptively adjusting a length of "off to on" transition periods. In some embodiments, the UE includes a greater number of DL subframes in the "off to on" transition period as measured SNR values decrease. In some embodiments, the UE includes at least two consecutive DL subframes in the "off to on" transition period when the measured SNR value falls below an SNR threshold value.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method for reducing power consumption by a user equipment (UE) operating in a connected discontinuous reception (C-DRX) mode in communication with a wireless network, the method comprising:
   by the UE:
      measuring one or more of:
         a signal-to-noise ratio (SNR) value, or
         a Doppler shift value of a communication channel between the UE and the wireless network; and
      adjusting a time span of a C-DRX warm-up period that immediately precedes an ON time period of a C-DRX cycle based at least in part on one or more of the SNR value or the Doppler shift value.

2. The method of claim 1, wherein adjusting the time span of the C-DRX warm-up period comprises:
   adjusting a number of downlink (DL) subframes included in the C-DRX warm-up period.

3. The method of claim 1, wherein adjusting the time span of the C-DRX warm-up period comprises:
   when the SNR value does not satisfy a SNR threshold, using a default time span value for the time span of the C-DRX warm-up period; and
   when the SNR value satisfies the SNR threshold, adjusting the time span of the C-DRX warm-up period to be shorter than the default time span value.

4. The method of claim 3, wherein adjusting the time span of the C-DRX warm-up period to be shorter than the default time span value comprises including fewer than all downlink (DL) subframes available in an unreduced C-DRX warm-up period that spans the default time span value.

5. The method of claim 1, wherein adjusting the time span of the C-DRX warm-up period comprises:
when the SNR value satisfies a SNR threshold, including at least two contiguous downlink (DL) subframes or a DL subframe contiguous with a special subframe in the C-DRX warm-up period,
wherein the special subframe comprises a transition subframe occurring between a DL subframe and an uplink (UL) subframe and including a DL signal and an UL signal.

6. The method of claim 1, wherein the C-DRX warm-up period comprises a time period during which the UE performs one or more of: channel estimation or timing loop adaptation.

7. The method of claim 1, wherein adjusting the time span of the C-DRX warm-up period comprises:
when the Doppler shift value exceeds a Doppler shift threshold and the SNR value satisfies a SNR threshold, adjusting the time span to include at most one or more contiguous downlink (DL) subframes that immediately precede the ON time period of the C-DRX cycle.

8. The method of claim 1, wherein adjusting the time span of the C-DRX warm-up period comprises:
including more or fewer downlink (DL) subframes in the C-DRX warm-up period based at least in part on the Doppler shift value.

9. The method of claim 1, wherein adjusting the time span of the C-DRX warm-up period comprises:
excluding special subframes from the C-DRX warm-up period when the Doppler shift value exceeds a Doppler shift threshold,
wherein a special subframe comprises a transition subframe occurring between a downlink (DL) subframe and an uplink (UL) subframe and including a DL signal and an UL signal.

10. The method of claim 1, wherein the UE operates in accordance with a time division duplex (TDD) Long Term Evolution (LTE) wireless communication protocol.

11. The method of claim 1, wherein the UE adjusts the time span of the C-DRX warm-up period further based at least in part on a subframe configuration for frames used for communication between the UE and the wireless network.

12. A mobile wireless device comprising:
one or more processors;
wireless circuitry, comprising one or more antennas, communicatively coupled to the one or more processors; and
memory communicatively coupled to the one or more processors and storing instructions that, when executed by the one or more processors, cause the mobile wireless device to:
measure one or more of:
a signal-to-noise ratio (SNR) value, or
a Doppler shift value of a communication channel between the mobile wireless device and a wireless network; and
adjust a time span of a connected discontinuous reception (C-DRX) warm-up period that immediately precedes an ON time period of a C-DRX cycle based at least in part on one or more of the SNR value or the Doppler shift value,
wherein the warm-up period comprises a time period during which the mobile wireless device performs one or more of: channel estimation or timing loop adaptation.

13. The mobile wireless device of claim 12, wherein the mobile wireless device adjusts the time span of the C-DRX warm-up period to include fewer than all downlink (DL) subframes available in an unreduced C-DRX warm-up period that spans a default time span value when the SNR value satisfies a SNR threshold.

14. The mobile wireless device of claim 12, wherein the mobile wireless device adjusts the time span of the C-DRX warm-up period to include at least two contiguous downlink (DL subframes) or a DL subframe contiguous with a special subframe in the C-DRX warm-up period when the SNR value satisfies a SNR threshold,
wherein the special subframe comprises a transition subframe occurring between a DL subframe and an uplink (UL) subframe and including a DL signal and an UL signal.

15. The mobile wireless device of claim 12, wherein the mobile wireless device adjusts the time span of the C-DRX warm-up period by including more or fewer downlink (DL) subframes in the C-DRX warm-up period based at least in part on the Doppler shift value.

16. The mobile wireless device of claim 12, where the mobile wireless device adjusts the time span of the C-DRX warm-up period by excluding special subframes from the C-DRX warm-up period when the Doppler shift value exceeds a Doppler shift threshold,
wherein a special subframe comprises a transition subframe occurring between a downlink (DL) subframe and an uplink (UL) subframe and including a DL signal and an UL signal.

17. An apparatus configurable for operation in a mobile wireless device, the apparatus comprising:
one or more processors; and
memory communicatively coupled to the one or more processors and storing instructions that, when executed by the one or more processors, cause the mobile wireless device to:
measure one or more of:
a signal-to-noise ratio (SNR) value, or
a Doppler shift value of a communication channel between the mobile wireless device and a wireless network; and
adjust a time span of a connected discontinuous reception (C-DRX) warm-up period that immediately precedes an ON time period of a C-DRX cycle based at least in part on one or more of the SNR value or the Doppler shift value,
wherein the warm-up period comprises a time period during which the mobile wireless device performs one or more of: channel estimation or timing loop adaptation.

18. The apparatus of claim 17, wherein the apparatus causes the mobile wireless device to adjust the time span of the C-DRX warm-up period to include fewer than all downlink (DL) subframes available in an unreduced C-DRX warm-up period that spans a default time span value when the SNR value satisfies a SNR threshold.

19. The apparatus of claim 17, wherein the apparatus causes the mobile wireless device to adjust the time span of the C-DRX warm-up period by including more or fewer downlink (DL) subframes in the C-DRX warm-up period based at least in part on the Doppler shift value.

20. The apparatus of claim 17, wherein the apparatus causes the mobile wireless device to adjust the time span of the C-DRX warm-up period by excluding special subframes from the C-DRX warm-up period when the Doppler shift value exceeds a Doppler shift threshold, wherein a special subframe comprises a transition subframe occurring between a downlink (DL) subframe and an uplink (UL) subframe and including a DL signal and an UL signal.

* * * * *